United States Patent
Hashimoto et al.

(10) Patent No.: US 7,284,125 B2
(45) Date of Patent: Oct. 16, 2007

(54) METHOD AND APPARATUS FOR PERSONAL IDENTIFICATION

(75) Inventors: Hideki Hashimoto, Rupinas Akasaka Nogizaka 302, 5-27, Akasaka 9-chome, Minato-ku, Tokyo (JP); Hirokazu Fukatsu, Aichi (JP)

(73) Assignees: Tietech Co. Ltd., Aocjo (JP); Hideki Hashimoto, Tokyo (JP)

( * ) Notice: Subject to any disclaimer, the term of this patent is extended or adjusted under 35 U.S.C. 154(b) by 686 days.

(21) Appl. No.: 10/239,541

(22) PCT Filed: Mar. 23, 2001

(86) PCT No.: PCT/JP01/02329

§ 371 (c)(1),
(2), (4) Date: Feb. 28, 2003

(87) PCT Pub. No.: WO01/71516

PCT Pub. Date: Sep. 27, 2001

(65) Prior Publication Data

US 2003/0159040 A1 Aug. 21, 2003

(30) Foreign Application Priority Data

Mar. 23, 2000 (JP) .............................. 2000-128648

(51) Int. Cl.
*H04L 9/00* (2006.01)
*H04K 1/00* (2006.01)
*G06F 15/16* (2006.01)
*H04L 9/32* (2006.01)

(52) U.S. Cl. ..................... 713/168; 380/30; 380/277; 705/59; 705/60; 709/200; 709/217; 709/229; 713/155; 713/170; 713/185; 726/15; 726/18

(58) Field of Classification Search ..................... None
See application file for complete search history.

(56) References Cited

U.S. PATENT DOCUMENTS

| 4,601,011 | A | * | 7/1986 | Grynberg | 713/184 |
| 5,131,038 | A | | 7/1992 | Puhl et al. | |
| 5,361,062 | A | | 11/1994 | Weiss et al. | |
| 5,657,388 | A | * | 8/1997 | Weiss | 713/185 |
| 5,737,421 | A | * | 4/1998 | Audebert | 713/185 |
| 6,055,638 | A | * | 4/2000 | Pascal et al. | 726/20 |

FOREIGN PATENT DOCUMENTS

CA 2 280 783 A1 9/1998

(Continued)

OTHER PUBLICATIONS

International Search Report (PCT/JP01/02329) dated Jun. 26, 2001.

*Primary Examiner*—Gilberto Barron
*Assistant Examiner*—Laurel Lashley
(74) *Attorney, Agent, or Firm*—Patterson, Thuente, Skaar & Christensen, P.A.

(57) ABSTRACT

A user-worn device 10a that is to be installed in user-worn equipment 30a that can be worn by a user, and a user device 20a that is to be installed in user equipment 40a to be used by the user are employed.

The original information is divided and stored as a first information segment (1) and a second information segment (2) in the user-worn device 10a and in the user device 20a (with the original information), respectively. The user-worn device 10a sends the first information segment (1) and the user device 20a combines the second information segment (2) stored in its storage with the received first information segment (1), forming a third piece of information. The identity of the user is authenticated if the third piece of information matches the original information. Once the identity of the user is authenticated, the user device 20a permits the use of the user equipment 40a.

4 Claims, 21 Drawing Sheets

FOREIGN PATENT DOCUMENTS

| | | |
|---|---|---|
| JP | 62-191198 | 8/1987 |
| JP | 04-306760 | 10/1992 |
| JP | 04-335730 | 11/1992 |
| JP | 10-149339 | 6/1998 |
| JP | 10-322325 | 12/1998 |
| JP | 11-167664 | 6/1999 |
| JP | 11-282806 | 10/1999 |
| JP | 11-338826 | 12/1999 |
| JP | 2000-011129 | 1/2000 |
| JP | 2000-076412 | 3/2000 |
| WO | WO97/39553 | 11/1997 |
| WO | WO 00/00882 | 1/2000 |

\* cited by examiner

METHOD AND APPARATUS FOR PERSONAL IDENTIFICATION

TECHNICAL FIELD

The present invention relates to a user authentication method and a user authentication device for verifying that the user trying to use user equipment is the intended user (authorized user) of that user equipment. More particularly, the present invention relates to a user authentication method and a user authentication device that can be ideally used in systems requiring authentication. Additionally, the present invention relates to a method of generating a user authentication device and the generation device thereof.

BACKGROUND ART

When a user is attempting to use a service offered by a service company, the service company carries out authentication in order to determine whether or not the person trying to use the service is the authorized user.

The authentication methods currently being used include, for example, a method that uses a secret code, a method that uses a signature, a method that uses a seal, and a method that uses an ID code.

The method that uses a secret code is used, for example, for withdrawing cash from a bank account using a cash card. To withdraw cash, the user inserts a cash card into the card insertion opening of a bank ATM (automatic teller machine) and enters his/her secret code. The ATM sends both the card information (e.g., ID) read from the cash card and the secret code entered by the user to an authentication center. The authentication center carries out authentication based on the secret code entered into the ATM, the card information read, and a database that contains the correspondence relationship between the card information and secret code stored in a storage means.

The method that uses a signature is used, for example, for paying for merchandise using a credit card. To pay for merchandise using a credit card, the user enters his/her signature in a merchandise purchase slip. The merchandise seller carries out authentication by comparing the signature in the merchandise purchase slip with the signature on the credit card.

The method that uses a seal is used, for example, for withdrawing cash from a bank account using a passbook. To withdraw cash from a bank account using a passbook, the user places his/her seal on a cash withdrawal form. The bank carries out authentication by comparing the seal placed on the cash withdrawal form with the seal that has been pre-registered.

The method that uses an ID code is used, for example, for preventing unauthorized use of user equipment. In this method, the same ID code is stored in a tag (a card with send/receive functions, for example) worn by the user and in the user equipment (a mobile telephone, for example) that the user will use. Although the tag can be used connected to the user equipment, it is often used as a radio tag. The user equipment compares the ID code sent from the tag to the ID code it has in storage, and if the two ID codes match each other, the user equipment lock is released (a use-enabling signal is output, for example).

Another known authentication method is a method that uses biological information (voice pattern, fingerprint, retinal pattern, image of facial features, etc.) unique to each individual. This authentication method reads the user's biological information using a biological information reading device, and carries out authentication by comparing the biological information that has been read with the biological information that has been pre-registered. This authentication method is highly accurate since it uses biological information unique to each individual.

The conventional methods that carry out user authentication by means of a secret code, signature, seal, or ID code may incorrectly identify the person using the cash card, the person using the credit card, the person using the passbook, or the person carrying the tag in which the ID code is stored as the legitimate user even if he/she is not. For example, if the user equipment (e.g., cash card) or seal is stolen, or if the information, such as the secret code, signature, or ID code, is stolen or leaked, the user equipment could be illegally used.

On the other hand, the conventional methods that use biological information for user authentication result in higher overall system cost because they require a biological information reading device (e.g., an image-capturing device), a biological information processing device (e.g., an image-processing device and a large-capacity storage device), etc. Moreover, if a finger is injured or an eye disease is present, the fingerprint or retinal pattern may be altered, lowering the authentication accuracy. Additionally, if retinal patterns are used, it is necessary to bring the eyes to the measurement position, which can be cumbersome. If fingerprints are used, a finger must be placed directly on a fingerprint-reading device, which may cause psychological discomfort for people who are particularly concerned about cleanliness.

DISCLOSURE OF THE INVENTION

The objective of the present invention is to provide a user authentication method and a user authentication device that are low-cost and highly reliable.

The user authentication method and user authentication device according to the present invention divide a single piece of information into multiple segments of divided information, store some of the segments of the divided information in a user-worn device that is worn by the user and store the other segments of the divided information in the user device provided in the user equipment to be used by the user. The user-worn device sends the information stored in it. The user device then combines the information stored in it with the received information, and determines that the user is the legitimate user if the predetermined information, e.g., the original information, can be reconstructed, and allows the user to use the user equipment. Because the only processing needed by the present invention is the combining of divided information as described above, it is possible to configure an authentication system more inexpensively than would be possible using biological information. Moreover, even if a card, ID tag, or secret code is stolen, the user equipment can never be illegally used as long as the user-worn device or user device is not stolen. Therefore, this method is more reliable than the methods that use a secret code, signature, seal, ID code, etc.

For the original information, various types of information, such as a symbol, graphic figure, or mathematical formula can be used. Also, for dividing the original information, various methods, such as geometric division and division based on a mathematical formula or logical formula can be used. In this sense, the user authentication method and user authentication device according to the present invention possess general-purpose applicability.

The number of user-worn devices to be used can be two or more. If there are two or more user-worn devices, the original information is divided into the number that is obtained by adding the number of user-worn devices to be used and the number of user devices to be used. The larger the number of portable devices, the greater the reliability. However, the combining processes will become complex.

Even using the present invention, if the information being sent and received between a user-worn device and a user device is leaked, the possibility exists that the user equipment could be illegally used. Therefore, it is necessary to implement a measure to prevent information leakage. The various embodiments of the present invention utilize various types of information leakage prevention technologies.

In a preferred embodiment of the present invention, an encryption device is provided on the transmission side and a decryption device is provided on the receiving side. In this way, it is possible to prevent information leakage during the transmission of information from the transmission side to the receiving side.

In another preferred embodiment of the present invention, only the encrypted code obtained by encrypting an original code using a predetermined encryption method is stored in the transmission side, and the decryption method and the original code are stored in the receiving side. In this case, since no encryption device is provided in the transmission side, it is difficult to reconstruct the original code even if the encrypted code is leaked.

In still another preferred embodiment of the present invention, an encryption method that uses an encryption formula that changes over time is used. In the present embodiment, only the encrypted code obtained by encrypting an original code using the encryption formula that is in effect at a given time is stored in the transmission-side device; the decryption formula in effect at the given time and the original code are stored in the receiving-side device. For encryption formulas that change over time, the chaos computation formula is preferable. Even if an encrypted code that has been encrypted using the chaos computation formula is leaked, it is nearly impossible to reconstruct the original code, resulting in significantly improved reliability.

In yet another preferred embodiment of the present invention, the public key encryption method is used as the encryption method. In the present embodiment, the user device sends to the authentication center the encrypted code obtained by encrypting both the first information segment received from the user-worn device and the second information segment stored in the user device itself, using a public key. The authentication center uses a secret key that corresponds to the public key to decrypt the received encrypted code. Then the authentication center determines whether or not the original information can be reconstructed by combining the first information segment with the second information segment. When the public key encryption method is used, the encrypted code cannot be reconstructed even if the public key is leaked, resulting in high reliability. Also, since all that is necessary is to allocate a single public key to each receiving side, managing keys is easy. As with the original information, it is also possible to divide a public key into a first public key and a second public key and store them in the user-worn device and the user device, for example. This will further improve reliability.

In still another preferred embodiment of the present invention, the user equipment is provided with a readout-prevention device that prevents information from being read out if an illegal attempt to read out the information stored in the user device is detected. For the readout-prevention device, a device that destroys the storage device is used, for example. In this way, a simple configuration can be used to prevent the information from being illegally read out.

Another objective of the present invention is to provide a generation device that can easily provide a user authentication device.

In a preferred embodiment of the present invention, a printed circuit board provided with an encryption device, an original information storage device, and an encrypted code storage device is prepared; then dividing this printed circuit board at a given time forms the first printed circuit board to be provided on the transmission side and the second printed circuit board to be provided on the receiving side. This method can easily produce a user authentication device provided with encryption functions.

In another preferred embodiment of the present invention, when a user enters the original information and specifies a division method, the entered original information is divided by the specified division method to form the first information segment and the second information segment, and a user-worn device into which the first information segment has been written and a user device into which the second information segment has been written are discharged from product discharge ports. In this way, the user can easily obtain a user authentication device that suits his/her tastes.

The objectives and advantages of the present invention can be better understood if the reader reads the description of the embodiments or claims described below while referencing the drawings.

IDEAL MODE OF IMPLEMENTING THE INVENTION

Preferred embodiments of the present invention will be explained below with references to the drawings.

Figure 1:
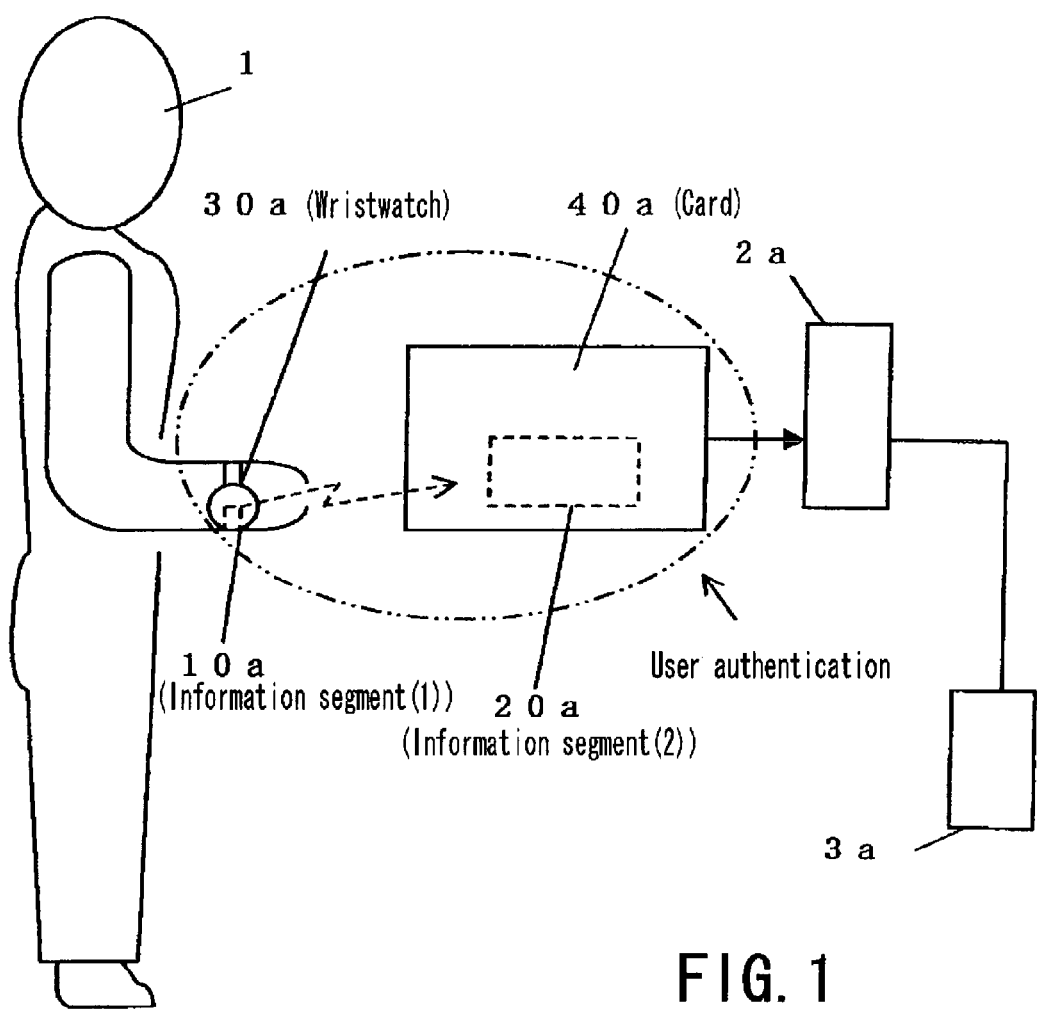
FIG. 1 is a diagram that explains the first embodiment of the user authentication method according to the present invention.

The first embodiment of the user authentication method corresponding to the present invention will be explained with reference to FIG. 1. Note that FIG. 1 illustrates an authentication system that uses the user authentication method according to the present invention.

For example, when a user 1 is to pay for merchandise using a debit card (user equipment) 40a, a conventional authentication method would perform user authentication as explained below.

First, the user 1 inserts the debit card 40a into the card insertion opening in an authentication terminal 2a, and also enters his/her secret code using an input means.

The authentication terminal 2a reads the card information (ID number) stored in the debit card 40a. Then, the authentication terminal 2a sends to an authentication center 3a the card information that has been read and the user information, which includes the secret code entered by the user 1.

The storage device at the authentication center 3a has in its storage a database that maintains the correspondence between secret codes and card information. The authentication center 3a performs authentication by comparing the card information and secret code contained in the user information sent from the authentication terminal 2a with the information stored in the database.

If the authentication is OK, the authentication center 3a sends an authentication OK signal to the authentication terminal 2a. In contrast, if the authentication is NG, the authentication center 3a sends an authentication NG signal to the authentication terminal 2a. As explained above, this authentication process does not check (authenticate) whether or not the user 1 is the legitimate owner of the debit card 40a. Therefore, in the present embodiment, a user authentication process (the area surrounded by the two-dot chain line in FIG. 1) is carried out as explained below before the user authentication process takes place at the authentication center 3a.

The user authentication device in the present embodiment consists of a user-worn device 10a provided in a wristwatch (user-worn equipment) 30a being worn by the user 1 and a user device 20a provided in the debit card (user equipment) 40a used by the user. The user-worn device 10a and the user device 20a are, for example, provided by the service company that performs user authentication. Various methods can be used for installing the user-worn device 10a and the user device 20a in the user-worn equipment 30a and the user equipment 40a, respectively. For example, an adhesive or adhesive tape may be used, or the devices may be contained inside the user-worn equipment 30a and the user equipment 40a.

Also, in the present embodiment, the user device 20a keeps the debit card 40a in a disabled state by outputting a disabling signal until the user is authenticated. In other words, the user device 20a prevents the authentication terminal 2a from reading the card information inside the debit card 40a.

The user-worn device 10a and the user device 20a store the information necessary for user authentication. For example, the information (original information) that is initially recognized as a single piece of information is divided into two segments; the first segment of the divided information (information segment (1)) is kept (stored) in the user-worn device (10a) provided in the user-worn equipment 30a, and the second segment of the divided information (information segment (2)) is kept (stored) in the user device 20a provided in the user equipment 40a. Various methods can be used for dividing the original information.

The user-worn equipment 30a need not be restricted to a wristwatch and may be anything as long as it can be worn or carried by the user 1. For example, rings, eyeglasses, belt buckles, bracelets, pendants, earrings, pierced earrings, wallets, commuter passes, driver's licenses, etc. can be used.

The user-worn device 10a need not be worn together with the user-worn equipment 30a, and can be carried in a pocket or briefcase, for example. The user equipment 40a need not be restricted to a card and may be anything that requires user authentication. It may be a mobile telephone or personal computer, for example. The user equipment 40a may be a type that is shared by multiple users.

The user-worn device 10a is equipped with a transmission means for sending the first information segment (1) to the user device 20a. The first information segment (1) may be sent using radio waves, ultrasonic waves, or light (infrared light).

When it receives the first information segment (1), the user device 20a combines the received first information segment (1) with the second information segment (2) stored in its storage, using a predetermined algorithm (combining method), and creates (forms) a third piece of information (3). Then, user authentication is carried out by comparing the third piece of information (3) with the original information. In other words, if the received first information segment (1) can be combined with the second information segment (2) stored in the user device 20a to successfully restore or reconstruct the original information, the user is authenticated. As explained above, the first information segment (1) and the second information segment (2) that were generated from the same original information are stored in the user-worn device 10a and the corresponding user device 20a. Consequently, it is only when the user device 20a receives the first information segment (1) that corresponds to the second information segment (2) that it can restore or reconstruct the original information.

In the authentication system illustrated in FIG. 1, the card information stored in the debit card (user equipment) 40a is output only when the identity of the user 1 is authenticated by the user device 20a.

For example, even if someone tries to use a lost or stolen debit card 40a, the user device 20a cannot receive the first information segment (1) sent from the user-worn device 10a being worn by the legitimate user 1 of the debit card 40a. Therefore, before the authentication center 3a performs user authentication, the user authentication process in the user device 20a provided in the debit card 40a reliably prevents unauthorized use of the card.

In the present embodiment, a single piece of information is divided into a first information segment (1) and a second information segment (2) like tallies, and the first information segment (1) and the second information segment (2) are stored in the user-worn device 10a and the user device 20a, respectively. Then, the user device 20a authenticates the identity of the user only when it can reconstruct the original information by combining the information stored in its storage with the received information. Therefore, such an authentication system can be built more inexpensively than one that uses biological information. Moreover, even if the secret code or card is lost or stolen, there is no risk of unauthorized use unless the user-worn equipment (user-worn device) is also lost or stolen. Furthermore, since the user-worn device 10a and the user device 20a store different segments of information, there is no risk of unauthorized use even if one of these devices is lost or stolen. Therefore, the method according to the present invention is more reliable than those that use secret codes, signatures, ID data, etc.

Note that the present embodiment relates to a method of verifying (authenticating) whether or not a user is the legitimate user of the user equipment before that user can use the user equipment. Therefore, the manner of utilizing the result of user authentication by the user equipment is then appropriately selected according to the type of user equipment or the mode in which the user equipment is used. For example, in the embodiment illustrated in FIG. 1, when the user device 20a authenticates the identity of the user, it allows the card information contained in the debit card (user equipment) 40a to be output to the authentication terminal 2a. In this way, the card information in the debit card 40a is read by the authentication terminal 2a. The user 1 also enters a secret code using the input means of the authentication terminal 2a. From this point on, the authentication center 3a carries out a user authentication process (a process for validating the legitimacy of the debit card) using the same procedure as in conventional methods.

Figure 2:
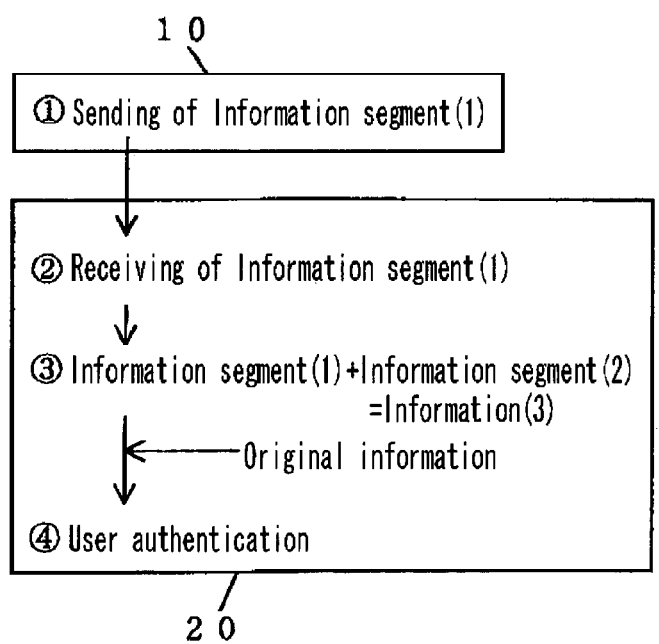
FIG. 2 is a diagram that explains an example of the processing procedure in the user authentication method according to the present invention.

FIG. 2 is a diagram that explains an example of the processing procedure in the user authentication method according to the present invention. In the present embodiment, the user device 20 always performs a user verification process. In the present embodiment, the user verification process is carried out according to procedures ①~④

① The user-worn device 10 sends out the first information segment (1) stored in its storage at the appropriate timing (e.g., at predetermined time intervals).

② The user device 20, which is in a receive-standby state, receives information segment (1).

③ When it receives information segment (1), the user device 20 combines the received information segment (1) with the second information segment (2) stored in its storage, using a predetermined algorithm, forming a third piece of information (3).

④ The user device 20 compares the third piece of information (3) with the original information, and authenticates the identity of the user if the third piece of information (3) matches the original information. In other words, the user is authenticated if information segment (1) can be combined with information segment (2) to reconstruct the original information.

Figure 3:
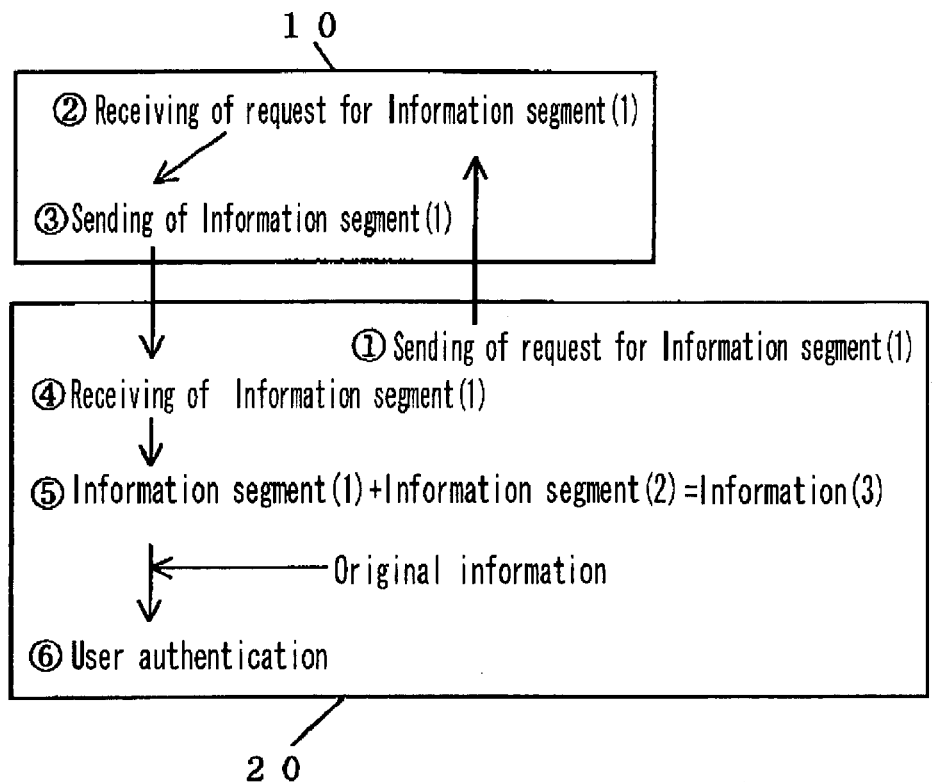
FIG. 3 is a diagram that explains an example of the processing procedure in the user authentication method according to the present invention.

FIG. 3 is a diagram that explains another example of the processing procedure in the user authentication method according to the present invention. In the present embodiment, the user device performs a user authentication process when user authentication is needed. In the present embodiment, the user authentication process is carried out according to procedures ①~⑥.

① When it is necessary to perform a user authentication process (e.g., when a debit card has been inserted into the card insertion opening of an authentication terminal), the user device 20 sends out a transmission request signal requesting transmission of the first information segment (1).

② The user-worn device 10, which is in a receive-standby state, receives the transmission request signal.

③ When it receives the transmission request signal, the user-worn device 10 sends out the first information segment (1) stored within it.

④ The user device 20, which is in a receive-standby state, receives information segment (1).

⑤ When it receives information segment (1), the user device 20 combines the received information segment (1) with the second information segment (2) stored in its storage, using a predetermined algorithm, forming the third piece of information (3).

⑥ The user device 20 compares the third piece of information (3) with the original information, and authenticates the identity of the user if the third piece of information (3) matches the original information.

Note that if it cannot receive the first information segment (1) or if the received information segment is not the correct first information segment (1), the user device 20 executes a predetermined process. For example, if the user device 20 cannot receive the first information segment (1) within a predetermined time interval after sending the transmission request signal, it resends the transmission request signal. If the first information segment (1) is not received even after the transmission request signal has been sent a predetermined number of times, the user device 20 judges that the user cannot be authenticated and executes a predetermined termination process. For example, the user device 20 displays an error message on the authentication terminal.

Next, an explanation will be given of a specific method of combining the divided information obtained by dividing the original information.

Figure 4:
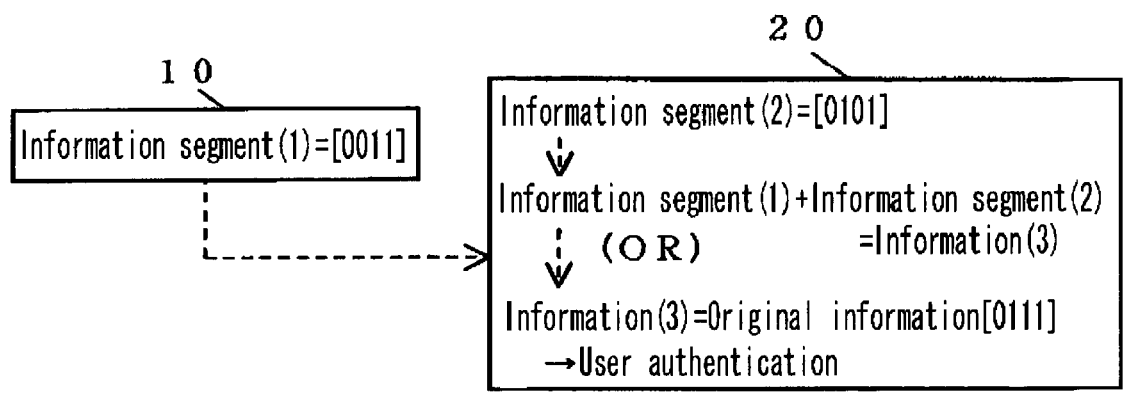
FIG. 4 is a diagram that explains an example in which the divided information is combined.

In the example illustrated in FIG. 4, the original information [0111] is divided into the first information segment (1) [0011] and the second information segment (2) [0101]. Then, the first information segment (1) is stored in the user-worn device 10; and the second information segment (2) and the original information are stored in the user device 20.

When it receives the first information segment (1), the user device 20 combines the received information segment (1) with the second information segment (2) stored in its storage, using a predetermined algorithm, forming the third piece of information (3). In the present embodiment, a logic "O R" operation is performed on the received first information segment (1) and the second information segment (2). If the received first information segment (1) is the correct first information segment (1), performing a logic "O R" operation on and the received first information segment (1) with the second information segment 2 will reconstruct the original information [0111]. Further, user authentication is performed by comparing the third piece of information (3) with the original information. In the present embodiment, it is then determined whether or not the third piece of information (3) is the same as the original information. For example, an exclusive O R (X O R) may be performed on the third piece of information (3) and the original information.

The division method is not restricted to the example illustrated in FIG. 4, and any method can be used as long as the divided first information segment (1) and second information segment (2) can be put through a predetermined logical operation to reconstruct the original information.

Figure 5:
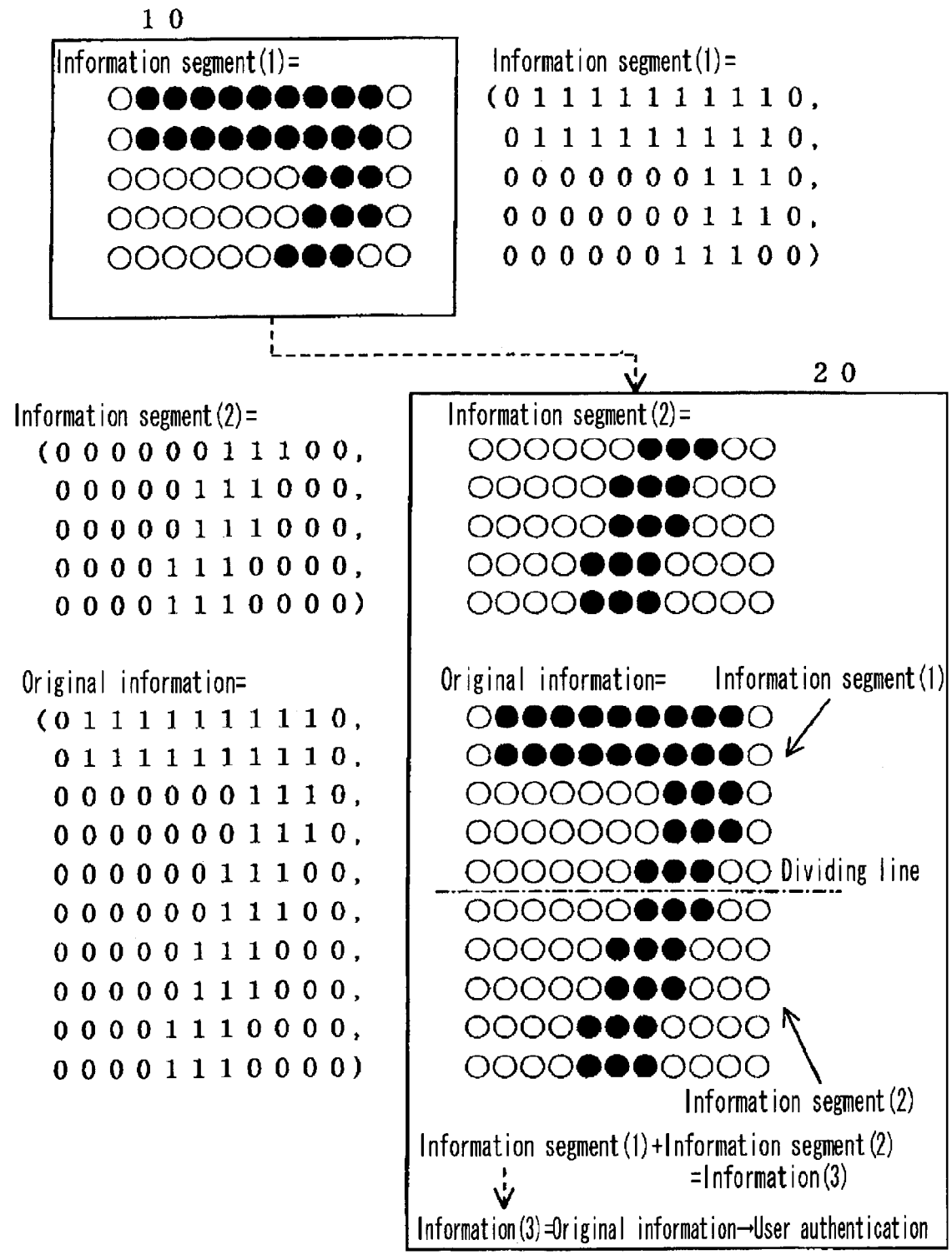
FIG. 5 is a diagram that explains an example in which the divided information is combined.

In the example illustrated in FIG. 5, the original information [a graphic bit matrix for the numeral 7] is divided by the dividing line drawn horizontally, which is indicated by the dot-dashed line shown in FIG. 5, into the first information segment (1) on the top and the second information segment (2) on the bottom. Then, the first information segment (1) is stored in the user-worn device 10; and the second information segment (2) and the original information are stored in the user device 20.

When it receives the first information segment (1), the user device 20 combines the received information segment (1) with the second information segment (2) stored in its storage, using a predetermined algorithm, thus forming the third piece of information (3). In the present embodiment, the bit matrix in the received information is combined with the bit matrix in the second information segment (2). If the received first information segment (1) is the correct first information segment (1), combining the bit matrix in the received information segment (1) with the bit matrix in the second information segment (2) will reconstruct the original information [a graphic bit matrix for the numeral 7]. Further, user authentication is performed by comparing the third piece of information (3) with the original information. In the present embodiment, it is then determined whether or not the graphic shape represented by the bit matrix in the third piece of information (3) is the same as the graphic shape represented by the bit matrix in the original information.

When drawing the dividing line, how it is drawn or how many dividing lines are drawn can be selected as appropriate. Furthermore, the number of segments into which the original information is divided, the dividing positions, etc. may be varied in many ways. For example, the original information may be divided into information segment (a1), information segment (a2), and information segment (a3); and information segment (a1) and information segment (a3) can be treated as the first information segment (1) while information segment (a2) can be treated as the second information segment (2).

It is also possible to use the same information for the first information segment (1) and the second information segment (2). In this case, the second information segment (2) [0111] (=the first information segment (1)) and the original information [0000], for example, are stored in the user device 20. The user device 20 performs a logic "XOR" operation on the received information segment (1) and the second information segment (2) stored in its storage, thus forming the third piece of information (3). Then, user authentication is performed by comparing the third piece of information (3) with the original information.

The algorithm for combining the received information with the information locally maintained is determined by the method used for dividing the original information.

Figure 6:
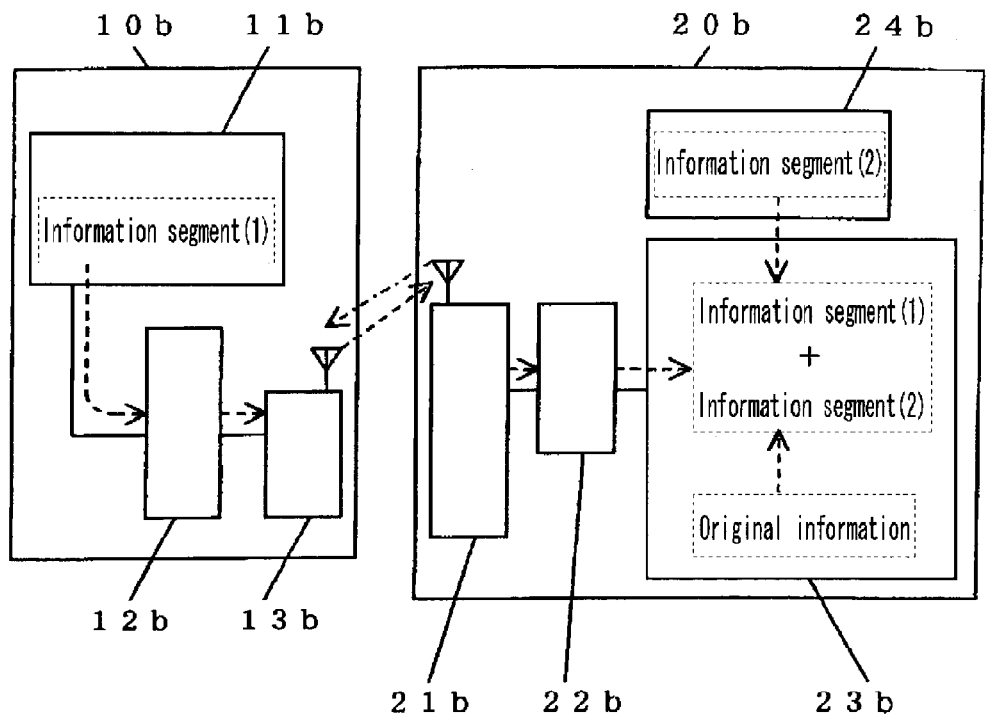
FIG. 6 is a block diagram of the first embodiment of the user authentication device according to the present invention.

Next, the block diagram of the first embodiment of the user authentication device according to the present invention is shown in FIG. 6. The user authentication device in the present embodiment has a user-worn device 10b and a user device 20b.

The user-worn device 10b is comprised of a signal output device 11b, a modulator/demodulator 12b, and a communication device 13b. The signal output device 11b has, for example, a storage means for storing the first information segment (1), and outputs the first information segment (1). Various formats can be used for the first information segment (1).

The modulator/demodulator 12b modulates the first information segment (1) that is output from the signal output device 11b and sends the result to the user device 20b via the communication device 13b. Alternatively, the modulator/demodulator 12b demodulates the signal received via the communication device 13b. If the demodulated signal contains a transmission request signal, the modulator/demodulator 12b modulates the first information segment (1) and sends the result via the communication device 13b. The user-worn device 10b is provided with a battery for supplying power to various constituent devices.

The user device 20b has a communication device 21b, a modulator/demodulator 22b, a combining device 23b, and a signal output device 24b. The modulator/demodulator 22b demodulates the signal received via the communication device 21b and outputs the result to the combining device 23b. Alternatively, the modulator/demodulator 22b modulates the transmission request signal and sends the result to the user-worn device 10b via the communication device 21b. Then, afterwards, the modulator/demodulator 22b demodulates the signal received via the communication device 21b and outputs the result to the combining device 23b.

The signal output device 24b has, for example, a storage device for storing the second information segment (2) and outputs the second information segment (2). The combining device (user authentication device) 23b combines information segment (1) that is input from the modulator/demodulator 22b with the second information segment (2) using a predetermined algorithm, thus forming the third piece of information (3). A method of matching tallies, for example, is used to combine the first information segment (1) and the second information segment (2). Further, the combining device (user authentication device) 23b performs user authentication based on the result of the comparison of the third piece of information (3) with the original information. The combining device 23b may be integrally provided with the signal output device 24b or the modulator/demodulator 22b. The user device 20b is provided with a battery for supplying power to various constituent devices.

The combining device 23b outputs an output-disabling signal when the user has not been authenticated, for example. When the output-disabling signal is being output from the combining device 23b, the user equipment is disabled. For example, an authentication terminal will not be able to read the card information stored in a debit card or a mobile telephone will not be usable. Note that the original information may be stored in the signal output device 24b.

If the user device is separate from the user equipment, signal transmission between the user device (combining device) and the user equipment is performed using radio communication or cables. If mutually connectable connection pins are provided in the user device and the user equipment, the user device can be connected to the user equipment by merely connecting the connection pins, thus simplifying the connection task.

The signal output device 11b, the modulator/demodulator 12b, and the communication device 13b of the user-worn device 10b; as well as the communication device 21b, the modulator/demodulator 22b, the combining device 23b, and the signal output device 24b of the user device 20b may be implemented using hardware or software.

The combining device 23b in the present embodiment corresponds to the user authentication device according to the present invention.

Figure 7:
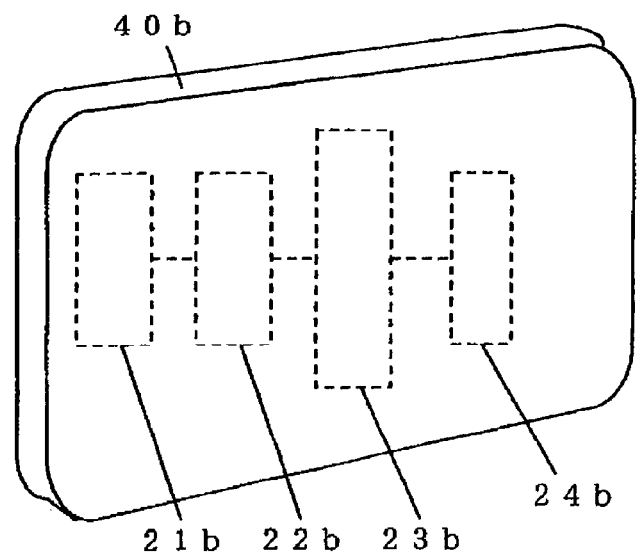
FIG. 7 is a diagram that illustrates an example of user equipment.

FIG. 7 is a perspective diagram of an example of the user equipment 40b. The user equipment 40b illustrated in FIG. 7 is formed into a card shape. This card contains the various devices 21b–24b illustrated in FIG. 6. The user equipment 40b also acts as communication equipment equipped with a communication function for communicating with the user-worn device 10b. For the user equipment 40b, a magnetic card, IC card, debit card, credit card, cash card, etc. can be used. For example, by providing an account-settlement card, such as a debit card, credit card, or cash card, with a communication function, the account-settlement card can be provided with a user authentication function. Note that the type of card need not be restricted to an account-settlement card or financial card, and may of course be a type of communication equipment, such as a radio device, that has been formed into a card shape.

Figure 8:
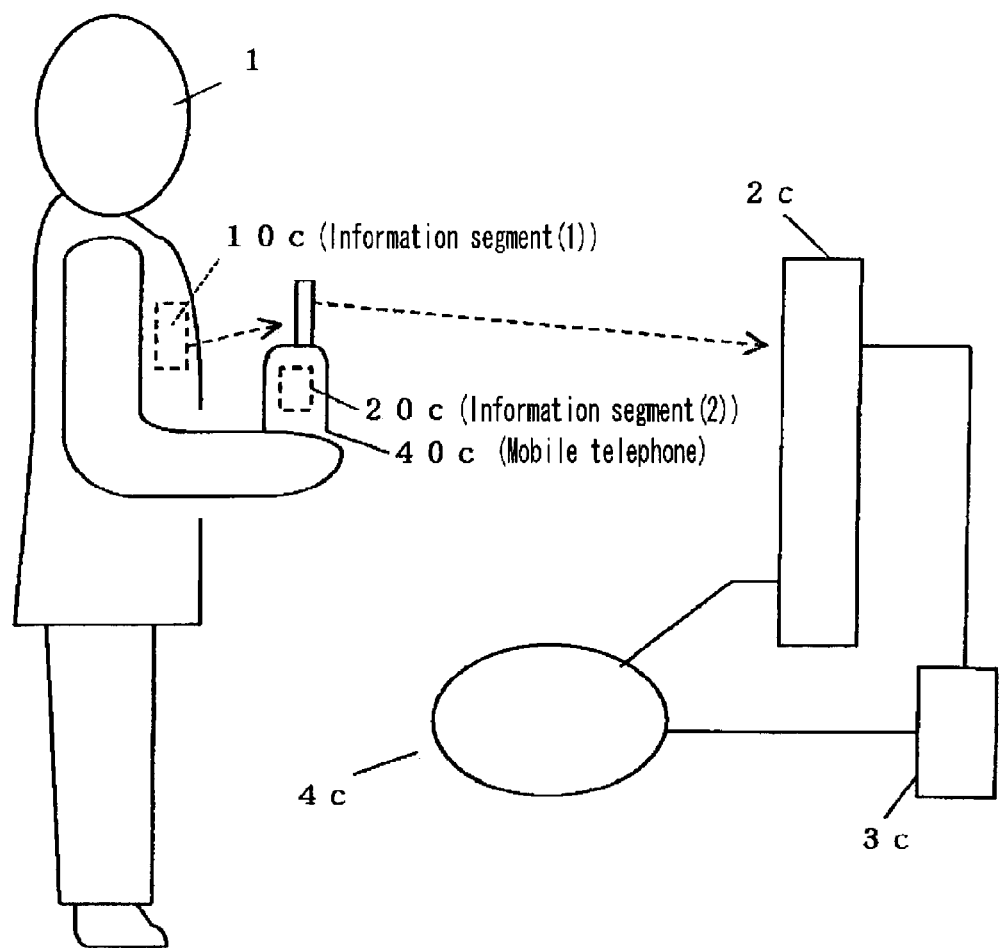
FIG. 8 is a diagram that explains the second embodiment of the user authentication method according to the present invention.

FIG. 8 is a diagram that explains the second embodiment of the user authentication method according to the present invention. In the present embodiment, a mobile telephone 40c is used as the user equipment. In the present embodiment, a user device 20c performs user authentication, and based on the result, determines whether or not to allow the mobile telephone 40c to be used. For example, the user device 20c provided in the mobile telephone 40c allows the mobile telephone 40c to be used only when information segment (1) sent from the user-worn device 10c is the correct first information segment (1) which corresponds to the second information segment (2) stored in the user device 20c. In this way, unauthorized use of the mobile telephone 40c can be prevented.

For the user equipment 40c, various types of equipment equipped with communication functions can be used, in addition to a mobile telephone. For example, a PHS (Personal Handyphone System) telephone, a PDA (Personal Data Assistance (personal portable information terminal)) radio device, a communicator for ETC (Electronic Toll Collection System (non-stop automatic toll collection system)), an in-vehicle communicator for ITS (Intelligent Transportation System), a telephone communication terminal (e.g., public telephone, FAX terminal), or a data communication terminal (e.g., personal computer), etc. can be used. What type of equipment will be used as the user equipment is a business or design decision. The mobile telephone 40c and the terminal device 2c may also be connected via a communication network 4c. Various connection and communication methods can be used between the mobile telephone 40c and the terminal device (e.g., authentication terminal) 2c.

Figure 9:
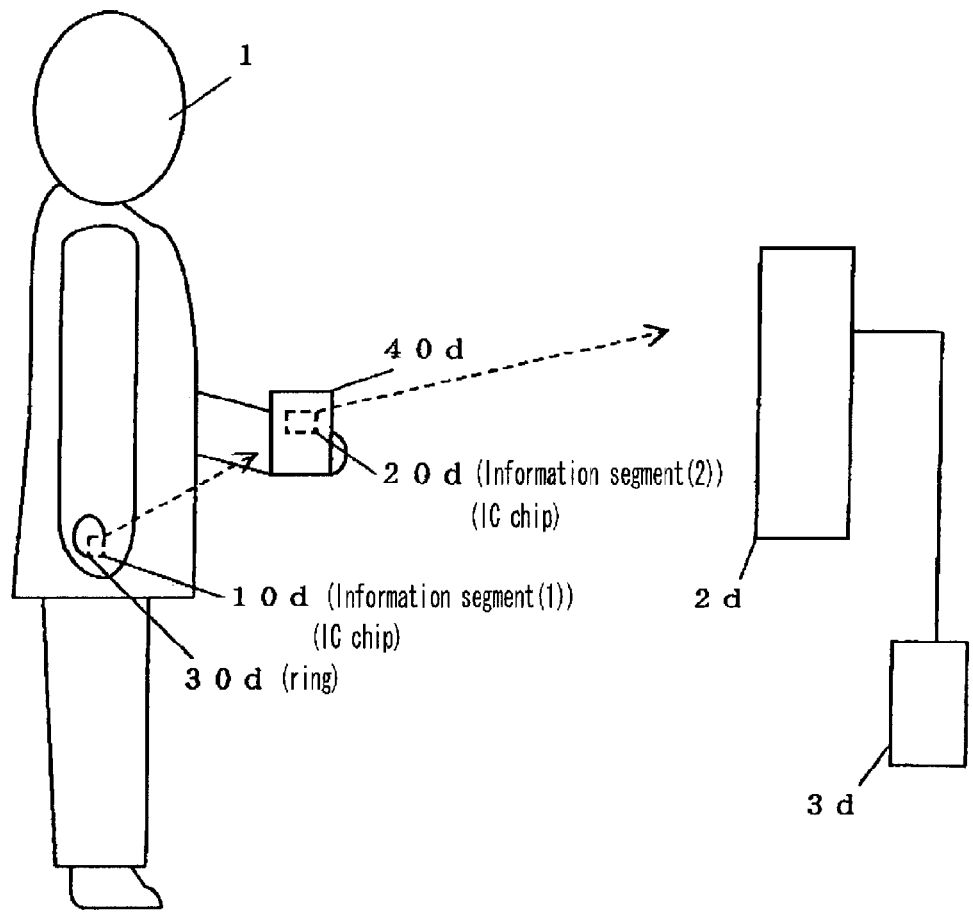
FIG. 9 is a diagram that explains the third embodiment of the user authentication method according to the present invention.

FIG. 9 is a diagram that explains the third embodiment of the user authentication method according to the present invention. In the present embodiment, a user-worn device 10d is comprised of an IC chip and is installed in a ring (user-worn equipment) 30d. Of course, the user-worn device 10d may be installed in user-worn equipment besides a ring. For example, it may be installed in a belt buckle, bracelet, pendant, earring, pierced earring, etc. In the present embodiment, the user device 20d is also comprised of an IC chip, and is installed in a radio device 40d.

An IC chip is an IC product having lead wires (external pins), in which an integrated circuit (IC) is packaged or molded. Naturally, IC also includes LSI (Large Scale Integration) and VLSI, etc. The level of circuit integration is not an issue. Note that either of or both the user-worn device and the user device can naturally consist of IC chips. Furthermore, the user device or part of the user device may consist of IC chips.

Figure 10:
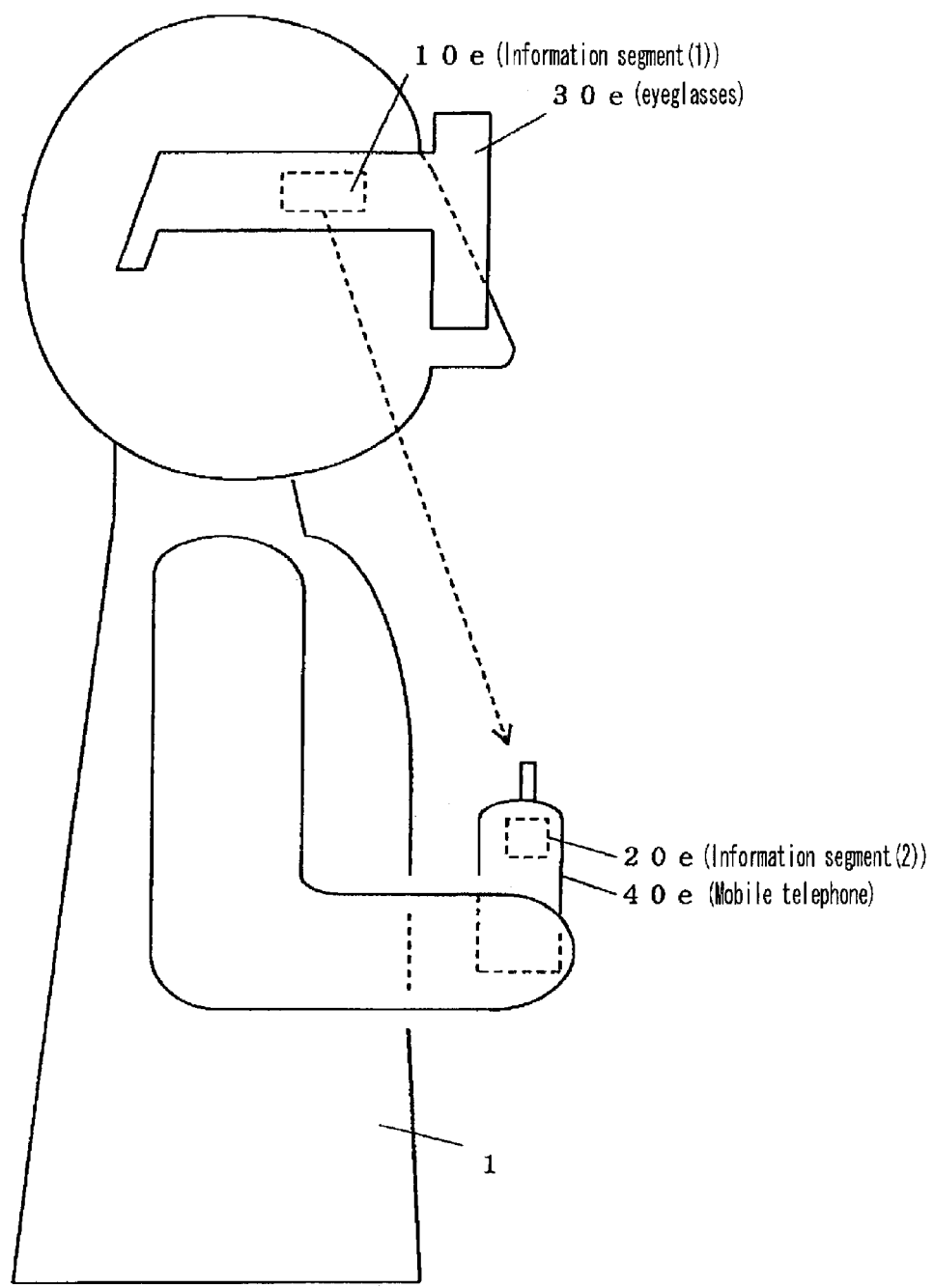
FIG. 10 is a diagram that explains the fourth embodiment of the user authentication method according to the present invention.

FIG. 10 is a diagram that explains the fourth embodiment of the user authentication method according to the present invention. In the present embodiment, a user-worn device 10e is installed in eyeglasses (user-worn equipment) 30e using an adhesive, for example. A mobile telephone 40e is used as the user equipment. Radio communication is used between the user-worn device 10e and the user device 20e. It is also possible to use the communication device in the mobile telephone 40e as the transmission device of the user device 20e.

The user-worn device 10e can also be an IC chip. Instead of the mobile telephone 40e, an IC card or a debit card consisting of an IC card can also be used. Alternatively, an IC card, etc. provided with mobile telephone functions can also be used. The user-worn device 10e can also be installed in a bracelet, belt, etc., instead of in eyeglasses. Alternatively, the user-worn device 10e can be carried around in the pocket or briefcase of the user, instead of being installed in the user-worn equipment.

Figure 11:
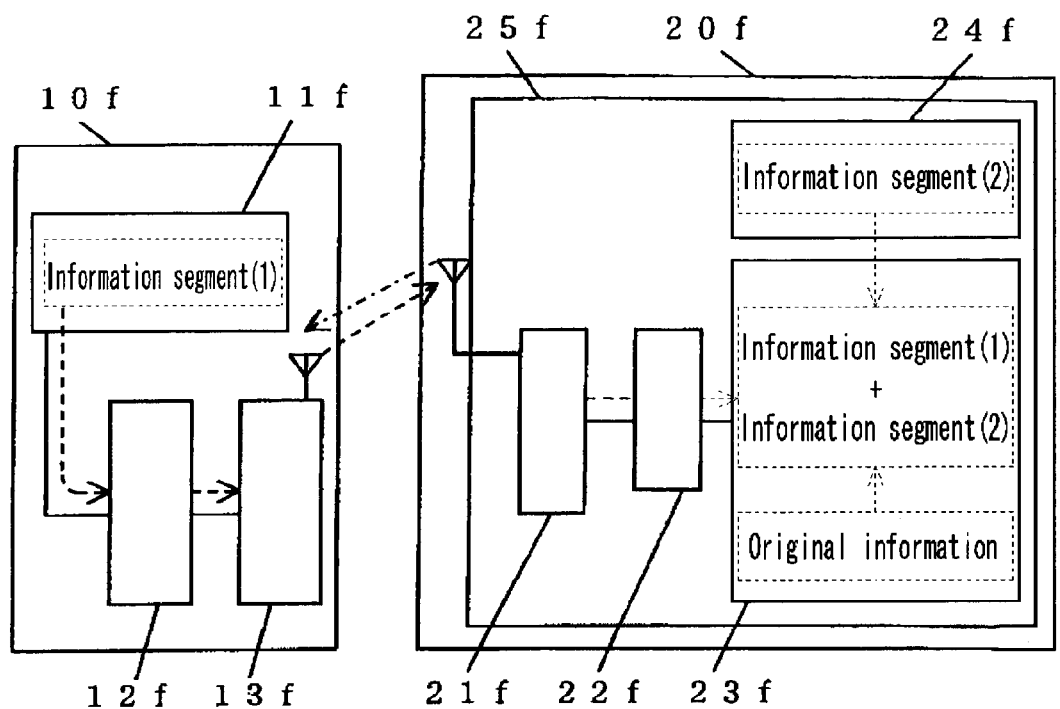
FIG. 11 is a block diagram of the second embodiment of the user authentication device according to the present invention.

FIG. 11 is a block diagram of the second embodiment of the user authentication device according to the present invention. In the present embodiment, some or all of the configuration elements of a user-worn device 10f and a user device 20f are configured using IC chips. In the embodiment illustrated in FIG. 11, a signal output device 11f, a modulator/demodulator 12f, and a communication device 13f of the user-worn device 10f are all configured using individual IC chips. Of course, it is also possible to configure these three devices using a single IC chip.

A signal output device 24f of the user device 20f is configured using an IC chip.

Note that it is also possible to configure a communication device 21f, a modulator/demodulator 22f, a combining device 23f, and a signal output device 24f of the user device 20f using a single IC chip 25f.

Figure 12:
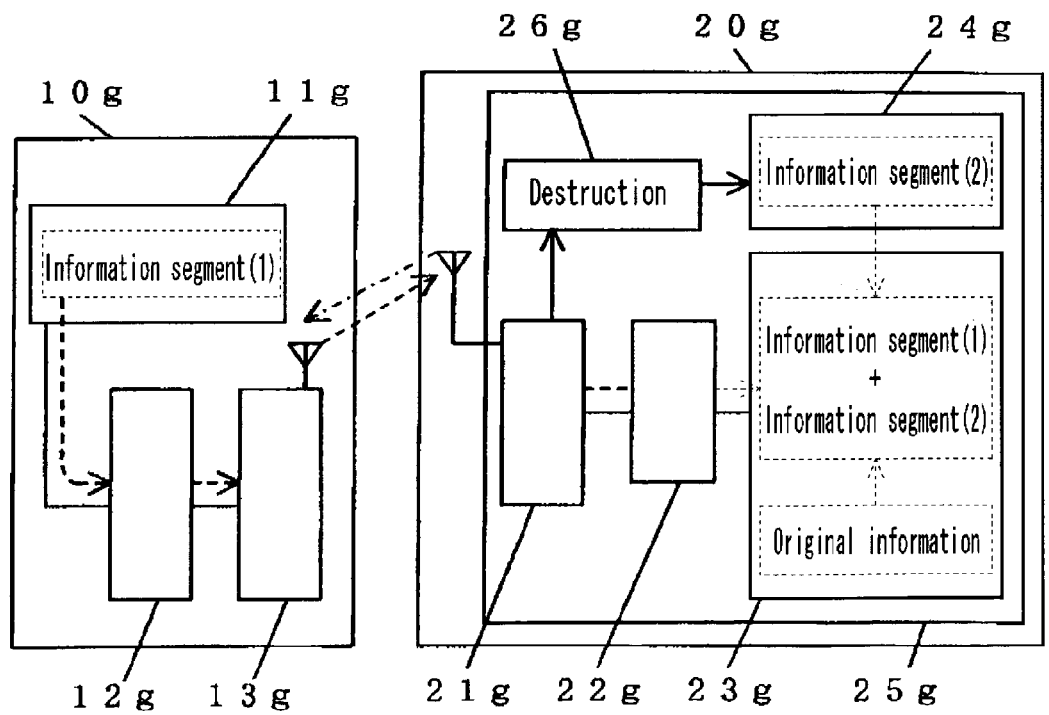
FIG. 12 is a block diagram of the third embodiment of the user authentication device according to the present invention.

FIG. 12 is a block diagram of the third embodiment of the user authentication device according to the present invention. In the present embodiment, a user device 20g is provided with a destruction device 26g. The destruction device 26g prevents predetermined information from being output from a signal output means 24g to the outside if an unauthorized attempt to read out information segment (2) stored in the signal output device 24g is detected.

An unauthorized attempt to read out [information] is detected based on the fact that the signal received by the communication device 21g, for example, contains a read-out signal that is different from the authentic read-out signal. The method of preventing signal output from the signal output device 24g can be, for example, to destroy the signal output device 24g by applying excess current to it. Alternatively, if information, etc. is stored in a volatile storage device, the information, etc. stored in the storage device can be erased by shutting off the power supply to the storage device.

Note that destruction device 26g can also be designed to destroy the signal output device 24g or the user device 20g if an attempt to disassemble the user device 20g is detected.

Figure 13:
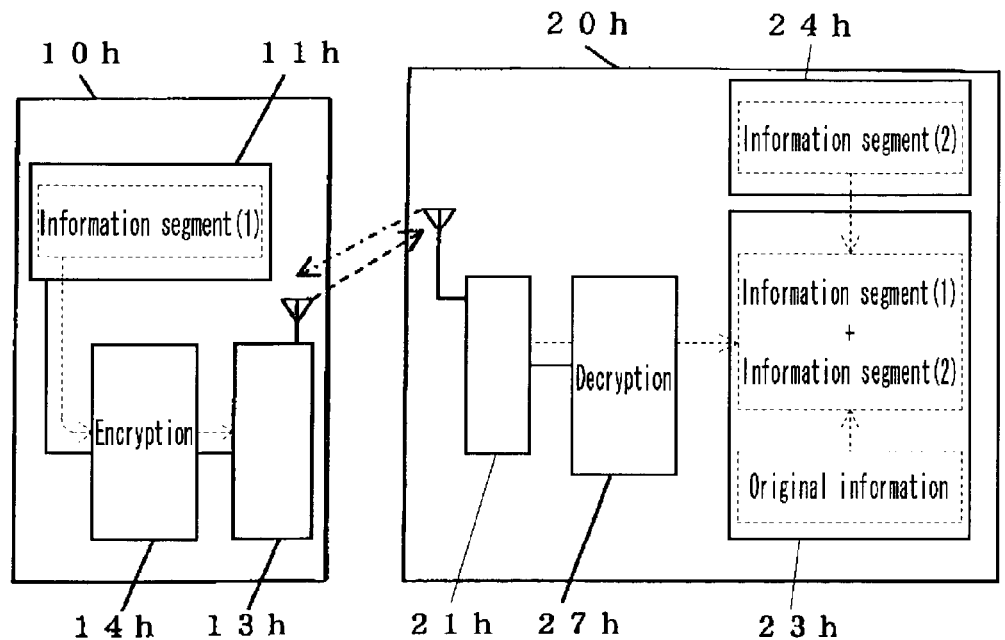
FIG. 13 is a block diagram of the fourth embodiment of the user authentication device according to the present invention.

FIG. 13 is a block diagram of the fourth embodiment of the user authentication device according to the present invention. A user-worn device 10h is comprised of a signal output device 11h, a modulator/demodulator 14h, and a communication device 13h. A user device 20h is comprised of a communication device 21h, a modulator/demodulator 27h, a combining device 23h, and a signal output device 24h. In the present embodiment, the modulator/demodulator 14h of the user-worn device 10h is provided with an encryption function (or both encryption and decryption functions in some cases). The modulator/demodulator 27h of the user device 20h is provided with a decryption function (or both decryption and encryption functions in some cases).

In the present embodiment, the user-worn device 10h encrypts the first information segment (1) and sends it. Then, the user device 20h obtains information segment (1) by deciphering the cipher in the received signal. This process further enhances security. Note that it is also possible to encrypt the signal to be sent from the user device 20h to the user-worn device 10h.

Note that both the encryption and decryption functions can be implemented using the same device or different devices. For the encryption method, various types of known encryption methods can be used.

Figure 14:
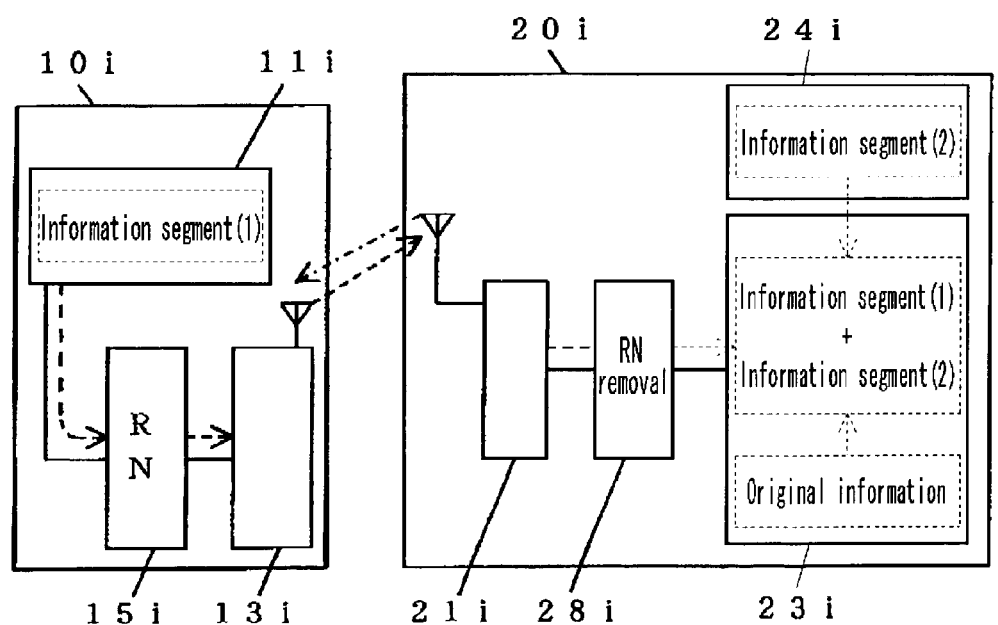
FIG. 14 is a block diagram of the fifth embodiment of the user authentication device according to the present invention.

FIG. 14 is a block diagram of the fifth embodiment of the user authentication device according to the present invention. A user-worn device 10i is comprised of a signal output device 11i, a modulator/demodulator 15i, and a communication device 13i. A user device 20i is comprised of a communication device 21i, a modulator/demodulator 28i, a combining device 23i, and a signal output device 24i. In the present embodiment, the modulator/demodulator 15i of the user-worn device 10i is provided with a function for inserting random noise (RN) into the signal to be sent (or both an RN-insertion function and an RN-cancellation function in some cases). The modulator/demodulator 28i of the user device 20i is provided with a function for removing random noise (RN) from the received signal (or both an RN-insertion function and an RN-cancellation function in some cases). In the present embodiment, the user-worn device 10i inserts random noise in the first information segment (1) before sending it. This process further enhances security.

Note that both the RN-insertion function and the RN-cancellation function can be implemented using the same device or different devices. For the method of preventing signal leakage, various known methods can be used beside the method that inserts random noise.

Figure 15:
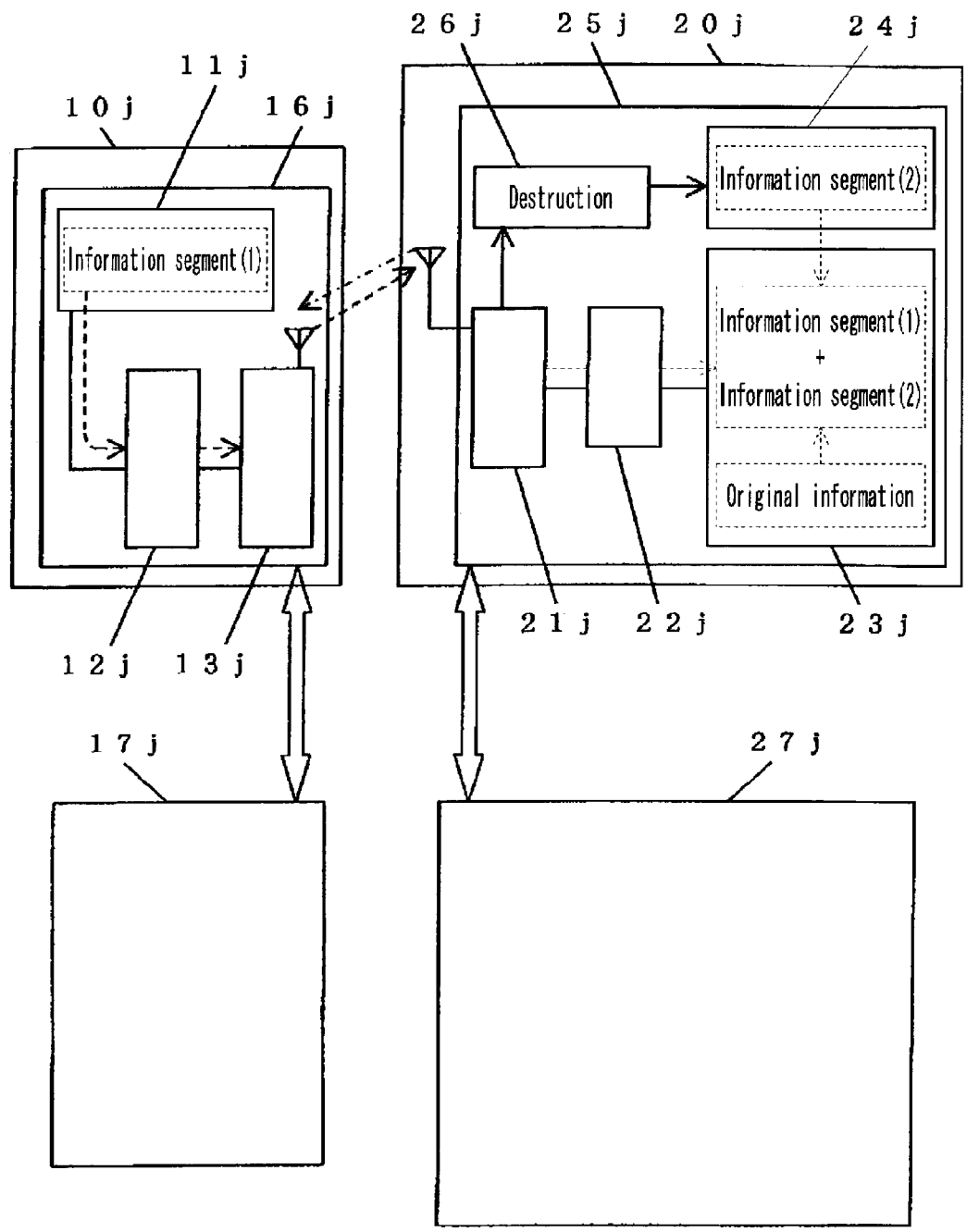
FIG. 15 is a block diagram of the sixth embodiment of the user authentication device according to the present invention.

FIG. 15 is a block diagram of the sixth embodiment of the user authentication device according to the present invention. A user-worn device 10j is comprised of a signal output device 11j, a modulator/demodulator 12j, and a communication device 13j. A user device 20j is comprised of a communication device 21j, a modulator/demodulator 22j, a combining device 23j, a signal output device 24j, and a destruction device 26j.

Even when an encryption function or an RN noise insertion function is used, a risk still exists that the first information segment (1) or the second information segment (2), which are user authentication information, may be leaked to a third party.

If it is suspected that the first information segment (1) or the second information segment (2) has been leaked, the first information segment (1) or the second information segment (2) can be replaced. Therefore, in the present embodiment, the signal output device 11j of the user-worn device 10j and the signal output device 24j of the user device 20j are designed to be replaceable. For example, the signal output device 11j, the modulator/demodulator 12j, and the communication device 13j of the user-worn device 10j are configured using a single IC chip 16j. Furthermore, the communication device 21j, the modulator/demodulator 22j, the combining means 23j, the signal output device 24j, and the destruction device 26j of the user device 20j are also configured using a single IC chip 25j. If necessary, the IC chip 16j of the user-worn device 10j and the IC chip 25j of the user device 20j can be replaced with an IC chip 17j and an IC chip 27j, respectively.

Note that the configurations of the IC chips can be varied in many ways. For example, it is possible to make only the signal output device 11j of the user-worn device 10j and the signal output device 24j of the user device 20j replaceable. As for the method of making IC chips replaceable, a structure can be used, for example, that allows IC chips to be inserted into pins or sockets.

Figure 16:
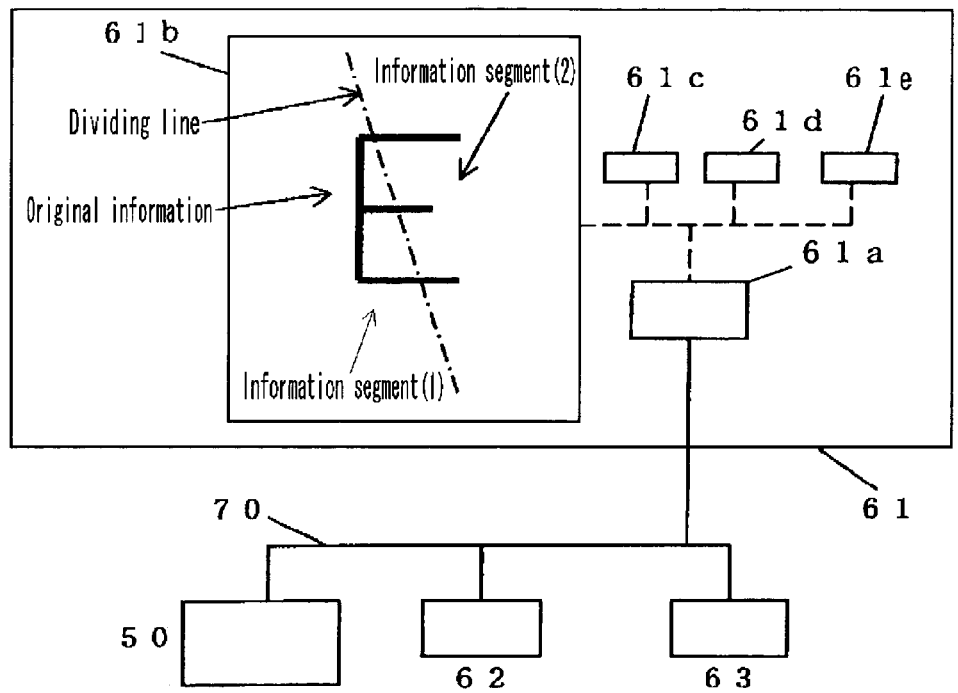
FIG. 16 is a block diagram of an embodiment of the generation device for the user authentication device according to the present invention.

Next, an embodiment of the generation device for the user authentication device according to the present invention is illustrated in FIG. 16.

The generation device in the present embodiment is comprised of a control device 50 and terminals 61~63. The control device 50 is connected to the individual terminals 61~63 through communication lines (e.g., the Internet, telephone lines) 70. For the communication lines, it is also possible to use radio communication. Terminals 61~63 can be installed in a convenience store or financial institution, for example. The control device 50 may be installed in any place, and its functions can also be performed by terminals 61~63.

The control device 50 has a storage device that stores the information to be displayed on the screen of a display means 61b of terminals 61~63 when a user authentication device is being generated using any of the terminals 61~63 and a program for dividing the input original information using the specified dividing method, etc.

Each of the terminals 61~63 is provided with a processing device 61a such as a CPU, a display device 61b, an input device 61c, an information-writing device 61d, and a product discharge device 61e, etc.

For the input device 61c, it is possible to use input keys, an information read-out device for reading out the information stored in a storage medium, an image information reading device for reading out image information, a touch-input device into which information is input by touching the screen of the display device with a finger or input pen, and the like.

For the information-writing device 61d, various contact- and non-contact type information-writing devices can be used as long as information (the first information segment (1) and the second information segment (2)) can be written into the storage devices of the user-worn device and user device, which comprise the user authentication device. If a contact-type information-writing device is used, it is preferable to provide a positioning means that aligns the pins of the user-worn device and the user device with the pins of the information-writing device.

The product discharge device 61e discharges a user-worn device and a user device, into which information has been written by the information-writing device 61d, from product discharge ports, e.g., product discharge ports provided in a terminal installed in a convenience store.

Next, the process of generating the user authentication device using the generation device in the present embodiment will be explained. Note that the explanation below assumes that the terminal 61 is installed in a convenience store and a user is purchasing a user authentication device using this terminal.

The explanation will also assume that user-worn devices and user devices are housed inside the terminal 61 such that they can be written by the information-writing device 61d.

A user who wants to purchase a user authentication device first selects "Buy User Authentication Device" from the menu screen displayed on the display device 61b of the terminal 61. When "Buy User Authentication Device" is selected from the menu screen, the processing device 61a of connecting the terminal 61b sends the "User Authentication Device Purchase" signal to the control device 50.

When it receives the "User Authentication Device Purchase" signal from the terminal 61, the control device 50 sends to the terminal 61 the input screen information for displaying the original information input display screen on the display device 61b of the terminal. 61. Based thereon, the processing device 61a of the terminal 61 displays the original information input display screen on the display device 61b.

While the original information input display screen is being displayed on the display device 61b, the user first enters the original information using the input device 61c. Various methods can be used for entering the original information. For example, ① a method in which an input pen is used to enter desired numbers, characters, symbols, graphic shapes, etc. into the original information input display screen being displayed on the display device 61b, ② a method in which the original information stored in a recording medium is read by an information reading device, ③ a method in which an image printed on paper, etc. is read by an image information reading device, and the like can be used. In the embodiment illustrated in FIG. 16, an input pen has been used to draw the letter "E" in the original information input display screen.

Next, the input device 61c is used to specify the method of dividing the original information. Various methods can be used for dividing the original information. For example, the original information can be divided using a dividing line or a predetermined logical formula. In the embodiment illustrated in FIG. 16, an input pen has been used to draw a dividing line (the one-dot chain line in FIG. 16) in the original information input display screen.

After entering the original information and specifying the dividing method (the dividing line in this case), the user specifies a dividing process. For example, the user selects the "Entry Completed" area being displayed in the original information input display screen. When a dividing process has been specified, the terminal 61 sends both the original information and the dividing method to the control device 50. For example, the bit pattern of the original information on the original information input display screen, and the positional information of the dividing line drawn on the display screen are sent.

When both the original information and the dividing method sent from the processing device 61a of the terminal 61 are received by the control device 50, it divides the entered original information using the specified dividing method, thus forming the first information segment (1) and the second information segment (2). In this case, when the control device 50 receives the positional information of the dividing line, it judges that a dividing method using a dividing line has been specified. In the embodiment illustrated in FIG. 16, the original information "E" is divided by the dividing line, and the resulting left portion of the "E" is treated as the first information segment (1) (see FIG. 17) and the resulting right portion of the "E" is treated as the second information segment (2) (see FIG. 17). Then, the first information segment (1) and the second information segment (2) that have been formed are sent to terminal 61.

When the processing device 61a of the terminal 61 receives both the first information segment (1) and the second information segment (2), it outputs the first information segment (1), the second information segment (2), and the original information (the information on "E" drawn on the input screen in this case) to the information-writing device 61d.

The information-writing device 61d writes the first information segment (1) into the storage device of the user-worn device 10 and the second information segment (2) into the storage device of the user device 20.

The product discharge device 61e discharges the user-worn device 10 into which the first information segment (1) has been written and the user device 20 into which the second information segment (2) and the original information have been written from the product discharge ports.

The user receives the user-worn device 10 and the user device 20 discharged from the product discharge ports.

For the user-worn device 10 and the user device 20 to be discharged from the product discharge ports, various modes of products can be used according to user applications. For example, if the user-worn device 10 is to be used attached to user-worn equipment (e.g., a wristwatch, eyeglasses, belt, earring, or key holder), it can be formed using a minute (e.g., several square millimeters), square IC chip and installed in the user-worn equipment through an installation means. For the installation means, an adhesive applied to one side of the IC chip, a clip, adhesive tape, etc. can be used. If the user device 20 is to be used connected to user equipment (e.g., mobile telephone) 40, a user device 20 provided with pins 29 that can be connected to the data input/output pins (connection pins) 49 provided on the user equipment (mobile telephone) 40 will be used, for example.

Of course, it is also possible to sell user-worn equipment (a wristwatch, eyeglasses, belt, earring, and key holder, etc.) in which the user-worn device 10 is integrated, or user equipment (a cash card, debit card, mobile telephone, mobile terminal, etc.) in which the user device 20 is integrated. In such cases, the task of installing the user-worn device 10 in the user-worn equipment or the user device 20 in the user equipment is not needed. Moreover, the integrated format simplifies handling.

The format of the user-worn device 10 and the user device 20 can be specified for each terminal, or can be selectable by the user during the acquisition of the user authentication device.

Note that a step may also be provided in which the user pays the purchase price of the user authentication device. The payment method for the purchase price can be selected as appropriate.

Figure 17:
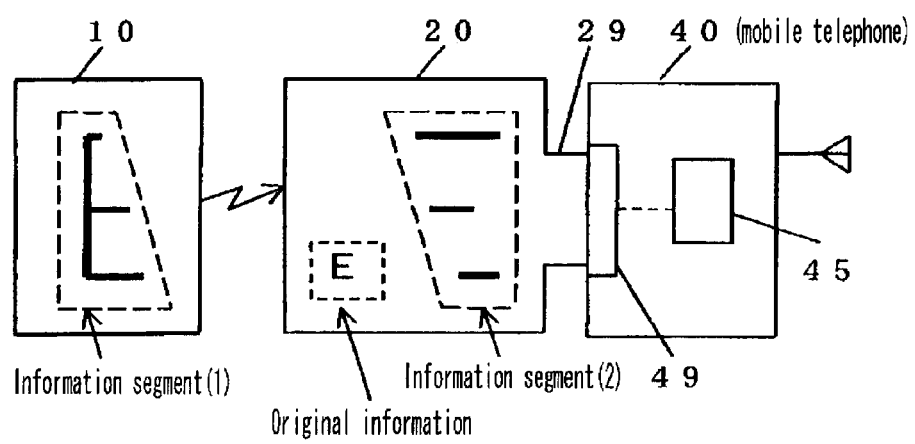
FIG. 17 is a diagram illustrating examples of the user-worn device and the user device generated by the generation device illustrated in FIG. 16.

FIG. 17 shows the user-worn device 10 and the user device 20 that were generated by the generation device in the present embodiment. The first information segment (1) formed by dividing the original information "E" is stored in the user-worn device 10. The second information segment (2) formed by dividing the original information "E" along with the original information "E" is stored in the user device 20.

The user-worn device 10 illustrated in FIG. 17 is used attached to user equipment by means of an adhesive, etc., or is carried in a wallet, purse, pocket, etc.

Furthermore, the user device 20 illustrated in FIG. 17 is provided with connection pins 29 that can be connected to the data input/output pins (connection pins) 49 of the mobile telephone 40, for example. To use this user authentication device, the connection pins 29 of the user device 20 are connected to the data input/output pins 49 of the mobile telephone 40. This connection makes it possible to transmit signals between the processing device (not shown in the figure) of the user device 20 and the processing device 45 of the mobile telephone 40. The processing device 45 of the mobile telephone 40 will disable the mobile telephone 40 if an output-prevention signal is being output from the user device 20.

Note that although the embodiment illustrated in FIG. 16 is comprised of a control device and a terminal, it is also possible to provide the terminal itself with the functions of the control device. In this case, the generation device can be comprised of the terminal alone. Further, although the original information displayed in the display device 61b was divided based on the dividing line specified by the display device 61b, the method of entering the original information and the method of specifying the dividing line are not restricted to those described above. Moreover, the number of dividing lines and the method of drawing them are not restricted to those illustrated in FIG. 16. Additionally, although the original information and the dividing line were manually entered, it is also possible to have multiple segments of original information and dividing lines available and to select appropriate ones from them. In this case, if either the original information or the dividing line is configured to be manually entered, there is little possibility that the divided information will be identical. Furthermore, although the original information was divided based on a dividing line, the method of dividing the original information is not restricted to this method. In addition, although a product discharge device was used, it is also possible to omit this device. The installation locations for terminals 61 through 63 can also be varied as appropriate. The method (procedure) for writing information into the user-worn device and the user device is not restricted to those explained in the embodiments, and various methods may be used.

Figure 18:
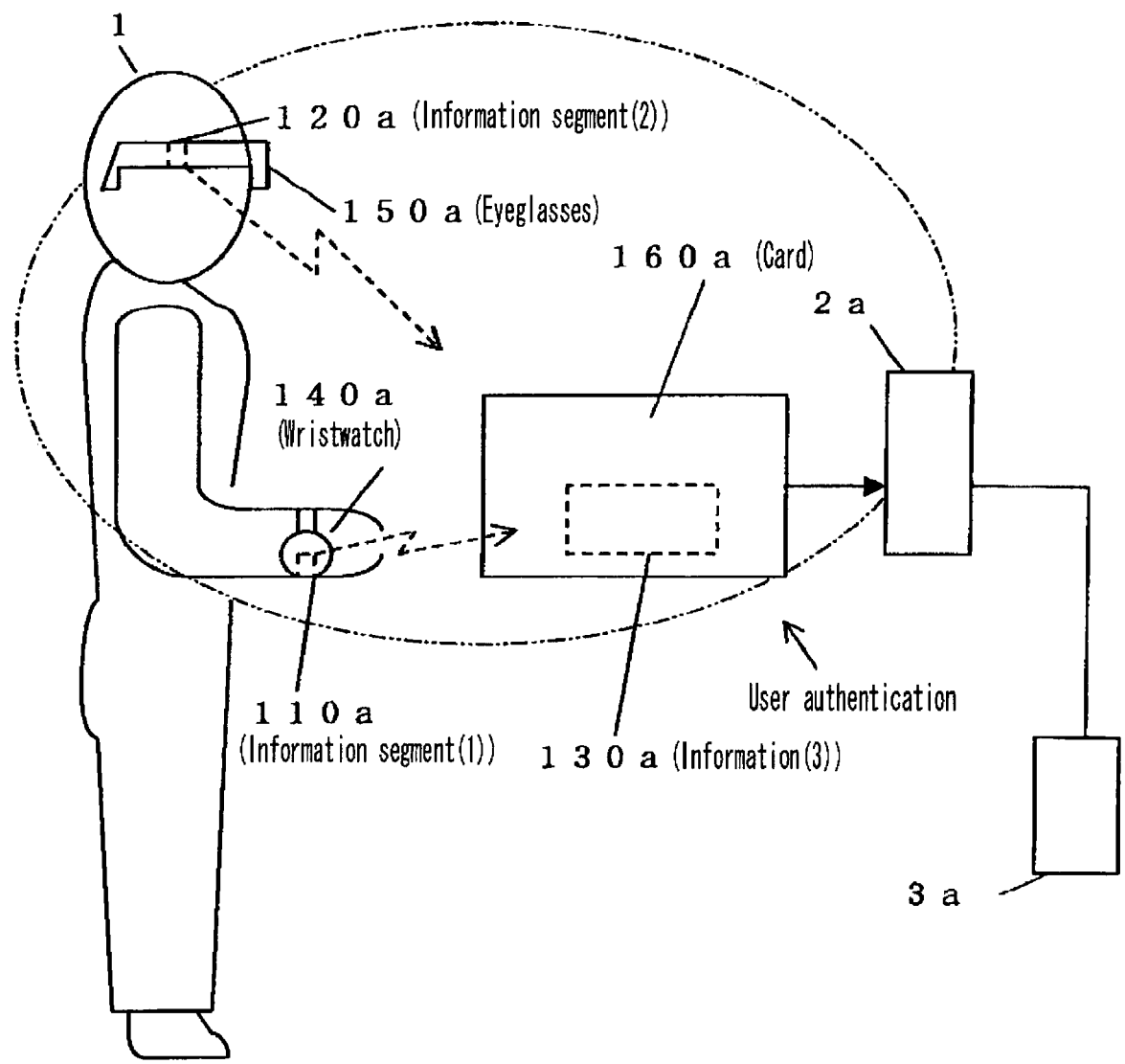
FIG. 18 is a diagram that explains the fourth embodiment of the user authentication method according to the present invention.

In the above embodiments, the original information was divided into two segments. However, it is also possible to divide the original information into three or more segments. FIG. 18 shows an embodiment in which the original information is divided into three segments.

In the present embodiment, the user authentication process (the area surrounded by the two-dot chain line) is performed as described below.

In the present embodiment, the user authentication device is comprised of a first user-worn device 110a, a second user-worn device 120a, and a user device 130a. The first user-worn device 110a and the second user-worn device 120a are installed in a wristwatch (first user-worn equipment) 140a and in eyeglasses (second user-worn equipment) 150a, respectively, to be worn by the user 1. The user device 130a is installed in the debit card (user equipment) 160a. In the present embodiment, the user device 130a keeps the debit card 160a disabled by outputting a disabling signal until the user is authenticated, for example.

The original information that is initially recognized as a single piece of information is divided into three segments; the first divided information segment (1), the second divided information segment (2), and the third divided information segment (3) are stored in the first user-worn device 110a, the second user-worn device 120a, and the user device 130a, respectively.

Note that the same user-worn equipment may also be used for the first user-worn equipment 140a and the second user-worn equipment 150a. Furthermore, the first user-worn device 110a and the second user-worn device 120a need not be worn along with the user-worn equipment 140a and 150a, and can be carried in a wallet, briefcase, or pocket, for example.

The first and second user-worn devices 110a and 120a are provided with transmission means for sending the first information segment (1) and the second information segment (2), respectively.

When it receives information segment (1) and information segment (2), the user device 130a combines the received information segment (1) and information segment (2) with the third information segment (3) stored in its storage, using a predetermined algorithm, forming the fourth piece of information (4). User authentication is performed by comparing the fourth piece of information (4) with the original information. In other words, the user is authenticated when the received information segment (1) and information segment (2) can be combined with the third information segment (3) stored in the user device 130a to successfully restore or reconstruct the original information.

Figure 19:
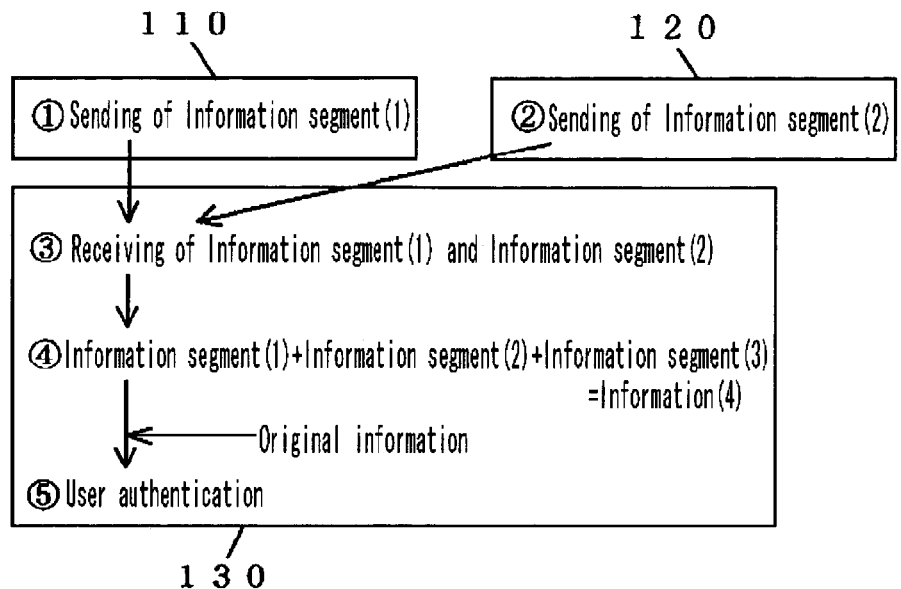
FIG. 19 is a diagram that explains an example of the processing procedure in the user authentication method according to the present invention.

FIG. 19 is a diagram that explains an example of the processing procedure in the user authentication method in which the original information is divided into three segments. In the present embodiment, the user device 130 always performs a user authentication process. In the present embodiment, the user verification process is carried out according to procedures ①~⑤.

① User-worn device 110 sends out the first information segment (1) at the appropriate timing.

② User-worn device 120 sends out the second information segment (2) at the appropriate timing.

Here, if user-worn device 110 and user-worn device 120 send information simultaneously, the two segments of information might interfere with each other, making it impossible for the user device 130 to accurately receive the information.

Therefore, it is preferable to set the transmission timing for user-worn device 110 to be different from the transmission timing for user-worn device 120. For example, the transmission timings for user-worn device 110 and user-worn device 120 can be preset.

③ The user device 130, which is in a receive-standby state, receives information segment (1) and information segment (2).

④ The user device 130 combines the received information segment (1) and information segment (2) with the third information segment (3) stored in its storage, using a predetermined algorithm, forming the fourth piece of information (4).

⑤ The user device 130 authenticates the identity of the user if the fourth piece of information (4) matches the original information.

Figure 20:
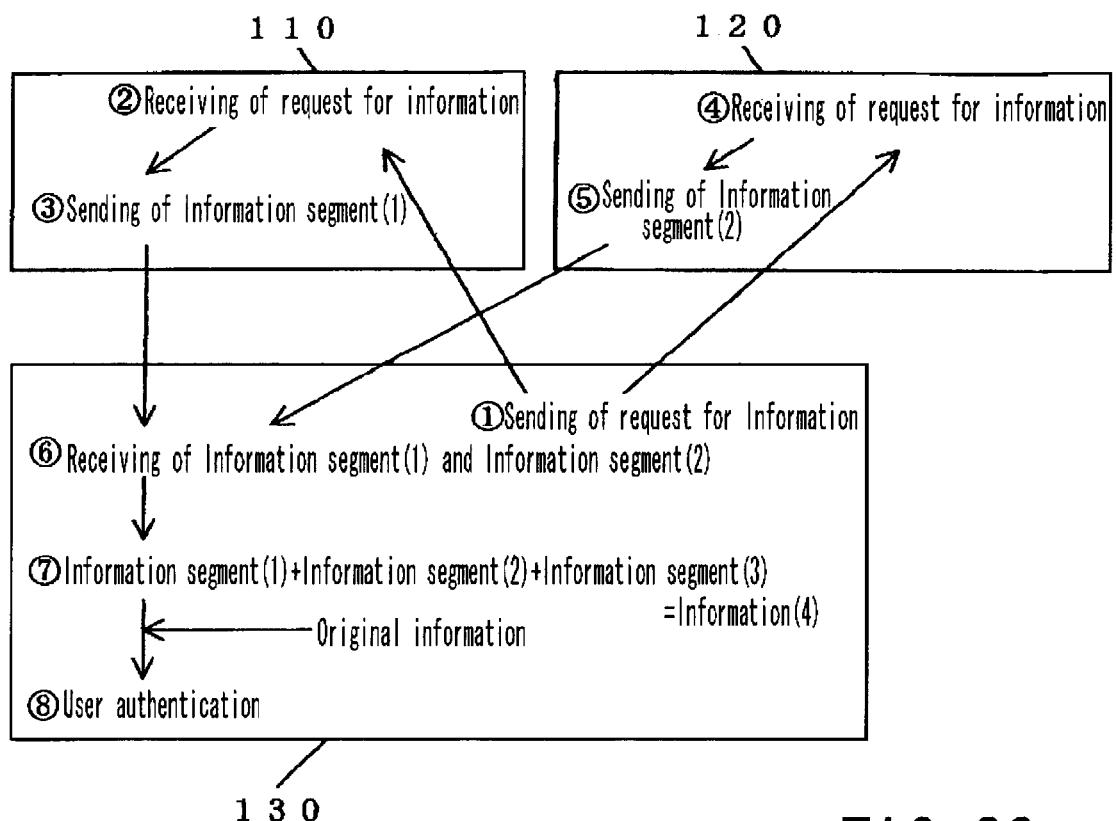
FIG. 20 is a diagram that explains an example of the processing procedure in the user authentication method according to the present invention.

FIG. 20 is a diagram that explains another example of the processing procedure in the user authentication method in which the original information is divided into three segments. In the present embodiment, the user device 130 performs a user authentication process when needed. In the present embodiment, the user verification process is carried out according to procedures ①~⑤.

① When it is necessary to perform a user authentication process, the user device 130 sends out a transmission request signal.

② When user-worn device 110, which is in a receive-standby state, receives the transmission request signal, it sends out the first information segment (1) stored in its storage.

③ When user-worn device 120, which is in a receive-standby state, receives the transmission request signal, it sends out the second information segment (2) stored in its storage.

Here, if user-worn device 110 and user-worn device 120 send information simultaneously, the two segments of information might interfere with each other, making it impossible for the user device 130 to accurately receive the information. Therefore, it is preferable to set the transmission timing for user-worn device 110 to be different from the transmission timing for user-worn device 120. For example, user-worn device 110 and user-worn device 120 can be set to send information after different wait-time periods elapse from the time the transmission request signal is received.

④ The user device 130, which is in a receive-standby state, combines the received information segment (1) and information segment (2) with the third information segment (3) stored in its storage, using a predetermined algorithm, forming the fourth piece of information (4).

⑤ The user device 130 authenticates the identity of the user if the fourth piece of information (4) matches the original information.

Figure 21:
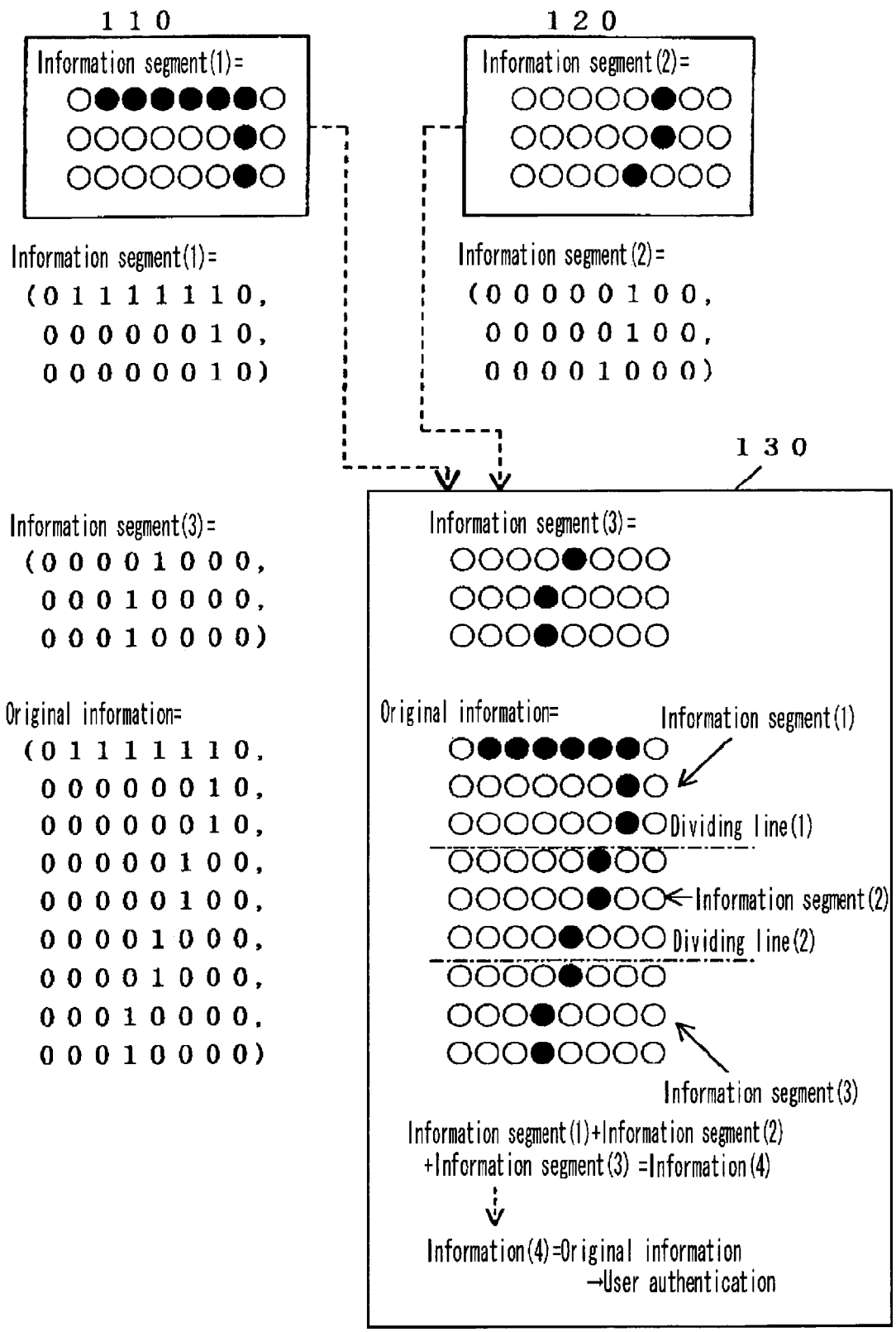
FIG. 21 is a diagram that explains an example in which the divided information is combined.

Next, a specific example of combining the divided information obtained by dividing the original information into three segments will be explained with reference to FIG. 21.

In the present embodiment, the original information [a graphic bit matrix for the numeral 7] is divided by two dividing lines (1) and (2), drawn horizontally, into the first information segment (1) on the top, the second information segment (2) in the middle, and the third piece of information (3) on the bottom. Then, the first information segment (1) is stored in the user-worn device 110; the second information segment (2) is stored in the user-worn device 120; and the third information segment (3) and the original information are stored in the user device 130.

The user device 130 combines the received information segments (1) and (2) with the third information segment (3) stored in its storage, using a predetermined algorithm, thus forming the fourth piece of information (4). In the present embodiment, the bit matrixes in the individual segments of information are combined. Then, user authentication is performed by comparing the fourth piece of information (4) with the original information.

Figure 22:
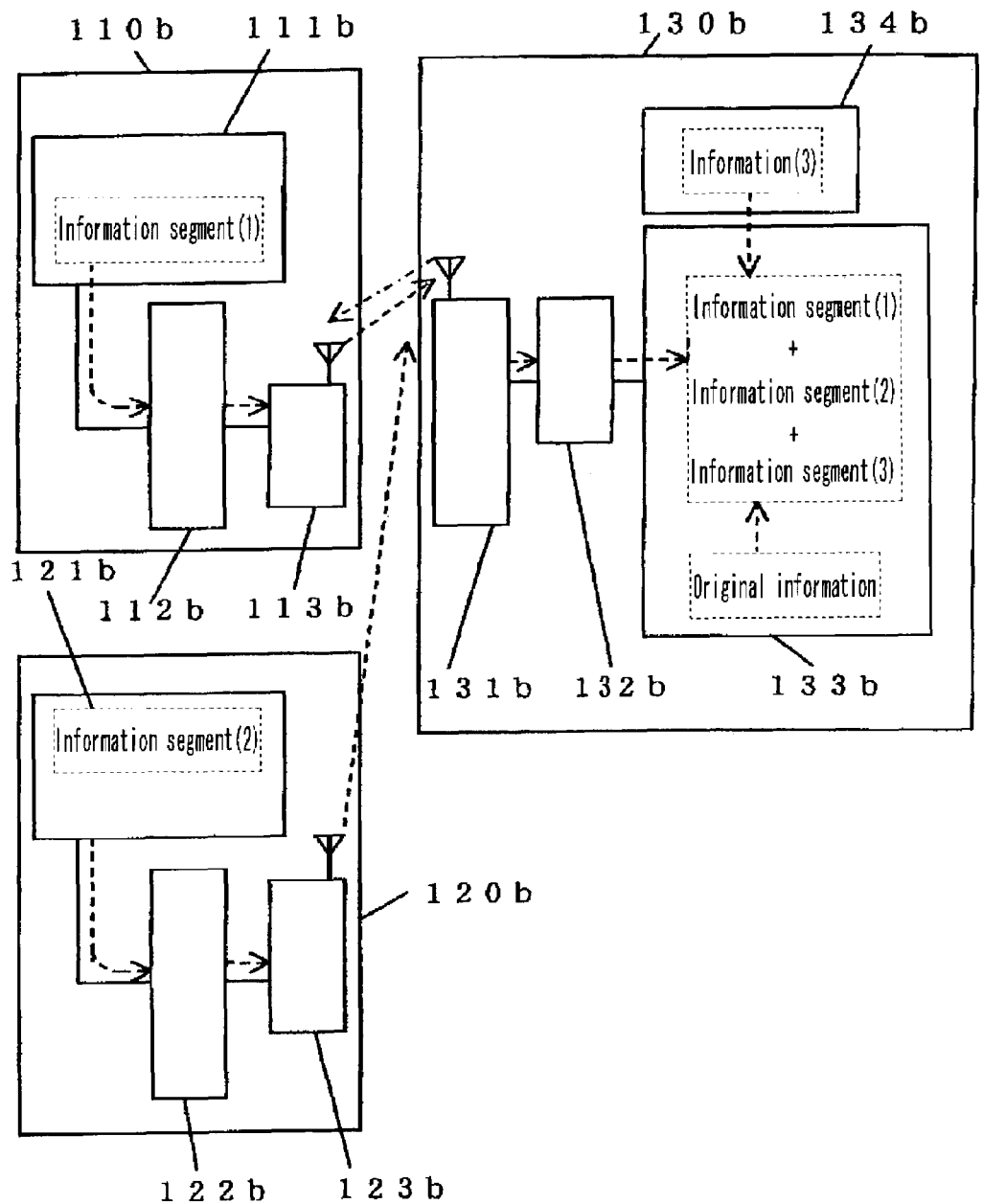
FIG. 22 is a block diagram of the seventh embodiment of the user authentication device according to the present invention.

A block diagram of the seventh embodiment of the user authentication device according to the present invention is illustrated in FIG. 22. The present embodiment is comprised of a first user-worn device 110b, a second user-worn device 120b, and a user device 130b.

The first user-worn device 110b is comprised of a signal output device 111b, a modulator/demodulator 112b, and a communication device 113b. The second user-worn device 120b is comprised of a signal output device 121b, a modulator/demodulator 122b, and a communication device 123b. The signal output devices 111b and 121b store the first information segment (1) and the second information segment (2), respectively.

The user device 130b is comprised of a communication device 131b, a modulator/demodulator 132b, a combining device 133b, and a signal output device 134b. The signal output device 134b stores the third information segment (3) and the original information. The combining device 133b combines the received information segments (1) and (2) with the third information segment (3) stored in its storage, using a predetermined algorithm, thus forming the fourth piece of information (4). Then, user authentication is performed by comparing the fourth piece of information (4) with the original information.

In the above embodiments, the original information was divided into three segments. However, it is also possible to divide the original information into four or more segments. In other words, the present invention can be configured as described below. ① The original information is divided to form N segments (where N is an integer that is 2 or greater) of divided information. ② The first through (N−1)-th segments of the divided information are stored in the first through (N−1)-th user-worn devices, respectively, and the N-th divided information segment is stored in the user device. ③ The user device (user authentication device) combines the received information with the information stored in its storage, using a predetermined algorithm, and verifies that the user is the legitimate user of the user equipment if the original information can be reconstructed.

Next, an embodiment of the generation method for the user authentication device according to the present invention, provided with an encryption function, will be explained with reference to FIG. 23.

Figure 23:
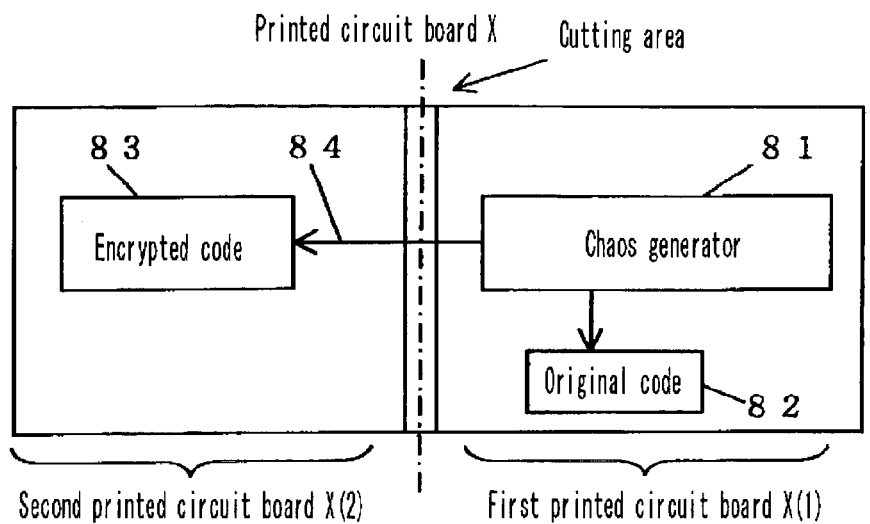
FIG. 23 is a diagram that explains an embodiment of the generation method for the user authentication device according to the present invention.

As shown in FIG. 23, a printed circuit board X, provided with an encryption device 81, an original code storage device 82, an encrypted code storage device 83, and a connection wire 84, is prepared.

The encryption device 81 encrypts the original code using an encryption formula or decrypts an encrypted code using a decryption formula. For the original code, various types of information can be used. In the present embodiment, the encryption device 81 determines the encryption formula and decryption formula using a chaos computation formula generated by a chaos generator, and then encrypts the original code using the encryption formula or decrypts an encrypted code using the decryption formula. The chaos generator generates a chaos computation formula that changes over time. As a principle, the chaos computation formula generated at a given point in time is determined by the initial value. The original code is encrypted by an encryption formula that uses the chaos computation formula, and it is nearly impossible to decrypt the encrypted code unless the initial value of the chaos computation formula is known. Since the chaos generator is known, a detailed explanation will be omitted.

The original code storage device 82 stores both the original code (the original code can remain constant or can vary over time) at each point in time and the decryption formula generated by the encryption device 81 at that point in time.

The encrypted code storage device 83 stores the encrypted code obtained by encrypting the original code using the encryption formula generated by the encryption device 81 at each point in time.

The encryption device 81 is connected to the encrypted code storage device 83 by the connection wire 84. If the connection wire 84 is cut, the storing of encrypted codes in the encrypted code storage device 83 is stopped. That is, the encrypted code storage device 83 stores and retains the encrypted code obtained by encrypting the original code by the encryption formula of the encryption device 81 at the point in time when the printed circuit board X is cut.

The printed circuit board X is provided with a cutting area in an appropriate location such that it can be easily cut. In the present embodiment, a scribed line is formed in the center of the printed circuit board X. A first printed circuit board X(1) and a second printed circuit board X(2) are formed on either side of the cutting area of the printed circuit board X.

The first printed circuit board X(1) is provided with the encryption device 81 and the original code storage device 82. The first printed circuit board X(1) is also provided with a modulator/demodulator and a communication device for sending and receiving information. It is further provided with a user authentication device for executing a user authentication process. The encryption device 81 may also double as the user authentication device. The first printed circuit board X(1) is also provided with a battery for supplying power to the encryption device 81, etc.

The second printed circuit board X(2) is provided with the encrypted code storage device 83. The second printed circuit board X(2) is also provided with a modulator/demodulator and a communication device for sending and receiving information. It is also provided with a battery for supplying power to various devices.

To generate a user authentication device, the printed circuit board X illustrated in FIG. 23 is cut in the cutting area X at the appropriate time. This operation separates the printed circuit board X into the first printed circuit board X(1) and the second printed circuit board X(2). At the same time, the connection wire 84 is cut, severing the connection between the encryption device 81 and the encrypted code storage device 83. As a result, the encrypted code storage device 83 stores and retains the encrypted code obtained by encrypting the original code using the encryption formula of the encryption device 81 at the time of severance.

Moreover, the original code at the time of severance and the encryption formula of the encryption device 81 at the time of severance are stored and retained in the original code storage device 82.

The first printed circuit board X(1) and the second printed circuit board X(2) thus formed comprise a pair of tallies, i.e., a user authentication device. In this case, the first printed circuit board X(1) is used as the tally member on the receiving side (user device) while the second printed circuit board X(2) is used as the tally member on the sending side (user-worn device).

For example, the user-worn device having the second printed circuit board X(2) sends the encrypted code stored in the encrypted code storage device 83. On the other hand, the user device on the receiving side, having the first printed circuit board X(1), decrypts the received encrypted code using the decryption formula stored in the original code storage device 82. Then, if the decrypted code matches the original code stored in the original code storage device 82, it is judged to be the pairing tally member. In other words, the user is authenticated.

Note that the communication devices for sending and receiving signals and the user authentication device can be provided in the first printed circuit board X(1) and the second printed circuit board X(2), or can be provided in a user device or a user-worn device containing the first printed circuit board X(1) and the second printed circuit board X(2).

Figure 24:
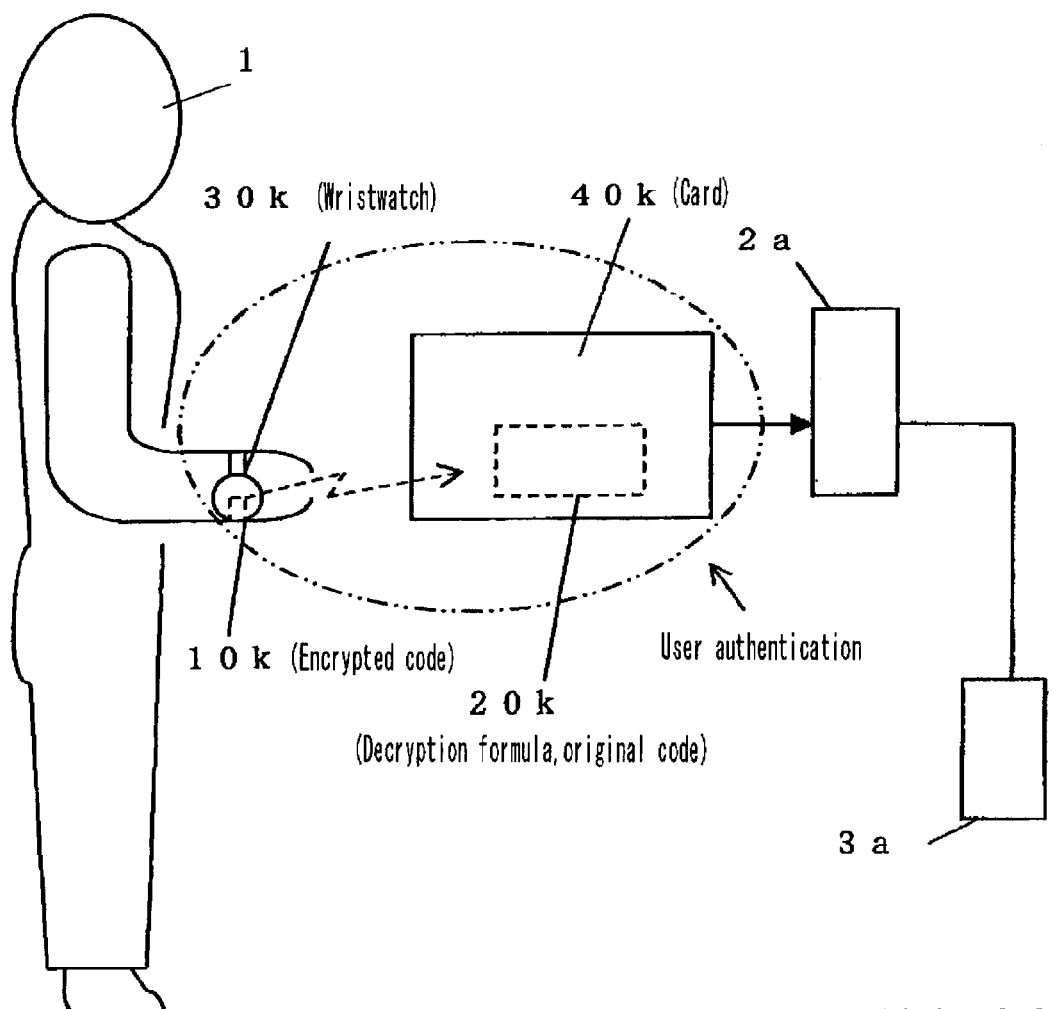
FIG. 24 is a diagram that explains the fifth embodiment of the user authentication method according to the present invention.

FIG. 24 shows a diagram in which an authentication system is built using a user authentication device thus generated.

In the embodiment illustrated in FIG. 24, the user authentication device is comprised of a user-worn device 10$k$ provided in a wristwatch (user-worn equipment) 30$k$ and a user device 20$k$ provided in a debit card (user equipment) 40$k$. The user-worn device 10$k$ is provided with the second printed circuit board X(2) while the user device 20$k$ is provided with the first printed circuit board X(1).

The user-worn device 10$k$ sends the encrypted code stored in a storage device 83. When it receives the encrypted code, the user device 20$k$ decrypts the received encrypted code using the decryption formula stored in the original code storage device 82. Then, if the decrypted code matches the original code stored in the original code storage device 82, the identity of the user is authenticated. As a result, the debit card 40$k$ becomes enabled.

Figure 25:
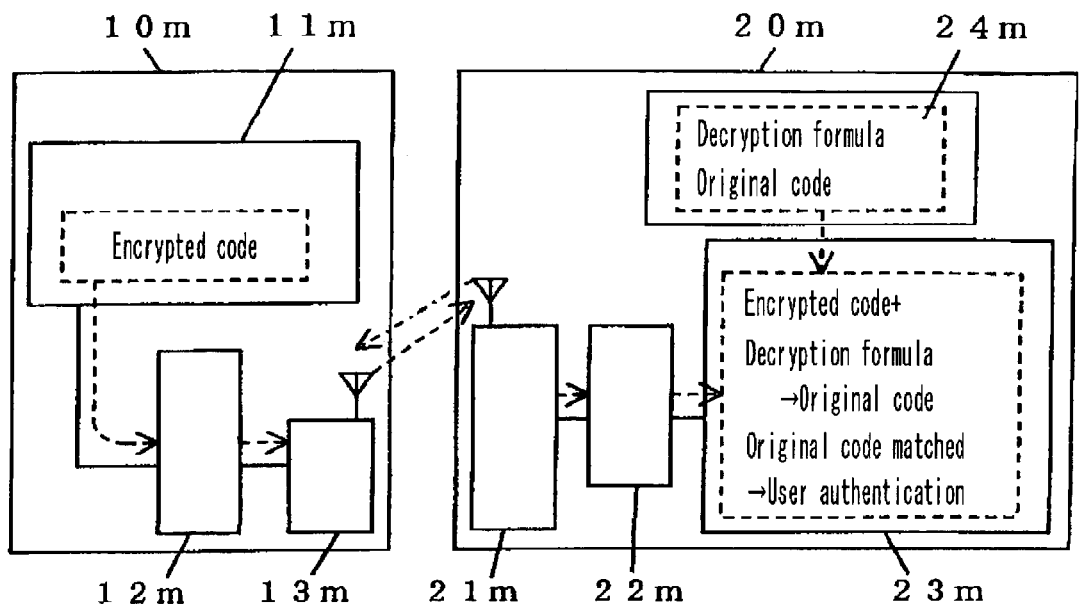
FIG. 25 is a block diagram of the eighth embodiment of the user authentication device according to the present invention.

Next, an example of the user authentication device illustrated in FIG. 24 is illustrated in FIG. 25.

A user-worn device 10$m$ is comprised of a signal output device 11$m$, a modulator/demodulator 12$m$, and a communication device 13$m$. The signal output device 11$m$ has an encrypted code storage device 83 and outputs an encrypted code.

A user device 20$m$ has a communication device 21$m$, a modulator/demodulator 22$m$, a user authentication device 23$m$, and a signal output device 24$m$. The signal output device 24$m$ has an original code storage device 82 and outputs the original code and a decryption formula. The user authentication means 23$m$ decrypts the received encrypted code using the decryption formula that is output from the signal output device 24$m$. Then, user authentication is performed by comparing the decrypted code with the original code that is output from the signal output device 24$m$.

Figure 26:
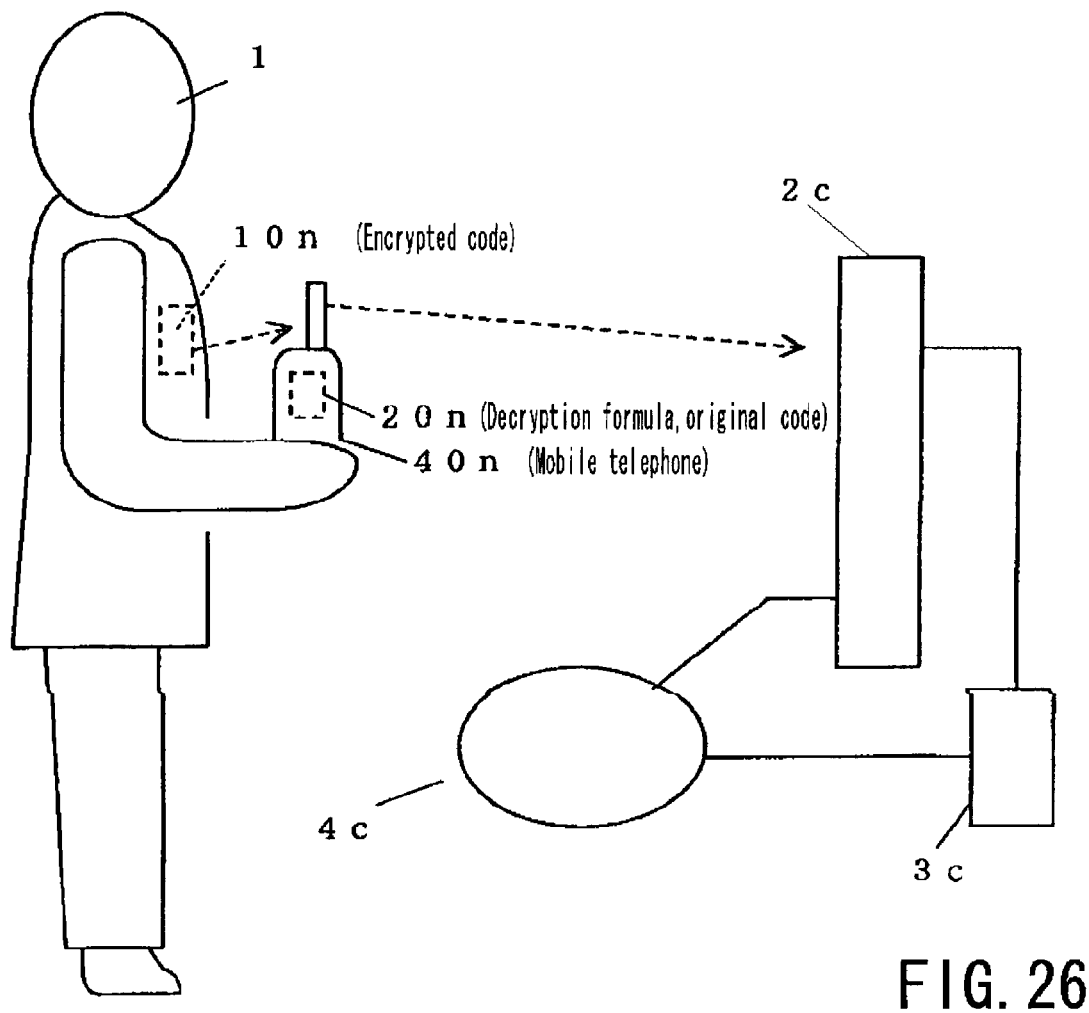
FIG. 26 is a diagram that explains the sixth embodiment of the user authentication method according to the present invention.

FIG. 26 illustrates another example of the user authentication device illustrated in FIG. 24. The embodiment illustrated in FIG. 26 uses a mobile telephone 40$n$ as the user equipment. Furthermore, a user-worn device 10$n$ is carried in a pocket.

Figure 27:
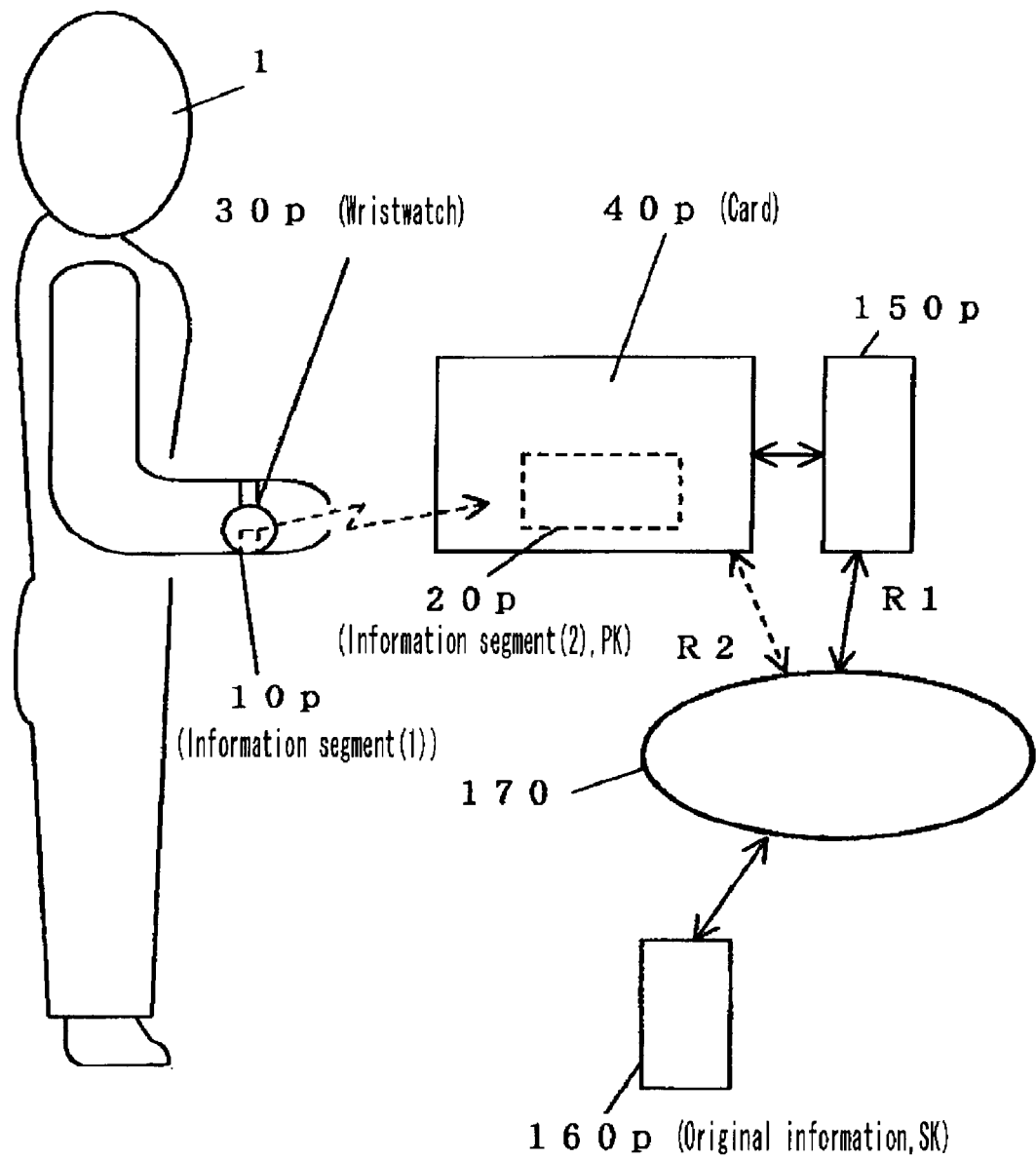
FIG. 27 is a diagram that explains the seventh embodiment of the user authentication method according to the present invention.

In the above embodiments, the user authentication process was performed by a mobile device. However, it is also possible to perform this process at, for example, an authentication center. FIG. 27 illustrates an authentication system in which an authentication device is used to perform user authentication at an authentication center, or the like.

In the present embodiment, information leakage is prevented by sending information using the public key encryption method. Since the public key encryption method is a known encryption method, a detailed explanation will be omitted. It uses both a public key and a secret key. Information that has been encrypted using a public key can only be decrypted using the secret key that corresponds to the public key. The information-transmission side uses the public key of the receiving side to encrypt the information to be sent before sending it. The information-receiving side decrypts the received information using its own secret key. When this public key encryption method is used, there is no need to provide the other party with a secret key, as would be the case with the common key encryption method; therefore, there is no leakage risk for the secret key. Moreover, since the information-receiving side can use a single public key, the number of keys necessary is smaller than that needed in the common key encryption method.

The user authentication device in the present embodiment is comprised of a user-worn device $10p$ provided in a wristwatch (user-worn equipment) $30p$, a user device $20p$ provided in a debit card (user equipment) $40p$, and an authentication center $160p$.

In the present embodiment, as in other embodiments, the original information is divided to form the first information segment (1) and the second information segment (2), and the first information segment (1) and the second information segment (2) are stored in the user-worn device $10p$ and the user device $20p$, respectively. The storage means (not shown in the figure) of the authentication center $160p$ stores the original information, which was used as the basis for information segment (2) stored in the user device $20p$ provided in the each piece of user equipment $40p$, as well as a database that stores the correspondence between each user device $20p$ (user equipment $40p$) and the secret key SK that corresponds to the public key PK being used by each user device $20p$.

The user-worn device $10p$ sends the first information segment (1) stored in it. The user device $20p$ encrypts the received information segment (1) and the second information segment (2) stored in its storage using the public key, and sends the results to the authentication center $160p$ via an authentication terminal $150p$. When it receives the information sent from the user device $20p$, the authentication center $160p$ searches for the secret key SK that corresponds to the user device $20p$ from the database stored in the storage means. Using the secret key SK found, the authentication center $160p$ decrypts the received information. In other words, information segment (1) received by the user device $20p$ and information segment (2) stored in the user device $20p$ are extracted. The decrypted information segment (1) and information segment (2) are combined to form the third piece of information (3), and user authentication is performed by comparing the third piece of information with the original information. If the user has been authenticated, the authentication center $160p$ sends an authentication OK signal to the authentication terminal $150p$. Based on this, the authentication terminal $150p$ enables the debit card $40p$. For example, reading the card information from the debit card $40p$ and entering a secret code are enabled, or the payment of an amount due is enabled.

Various methods can be used for sending information from the user device $20p$ to the authentication center $160p$. For example, if the user equipment is a debit card not equipped with a non-contact communication device (radio communication device), the information is sent to the authentication center $160p$ via a route R1. This route R1 reaches the authentication center $160p$ via the connection pins of the user equipment and the authentication terminal $150p$, and a communication line $170$. If the user equipment is a mobile telephone equipped with a radio communication device, the information is sent to the authentication center $160p$ via a route R2, which reaches the authentication center $160p$ via the radio communication device and the communication line $170$. If the user device $20p$ has a radio communication device, the information may also be sent directly from the user device $20p$ to the authentication center $160p$ via the radio communication device and the communication line $170$.

Figure 28:
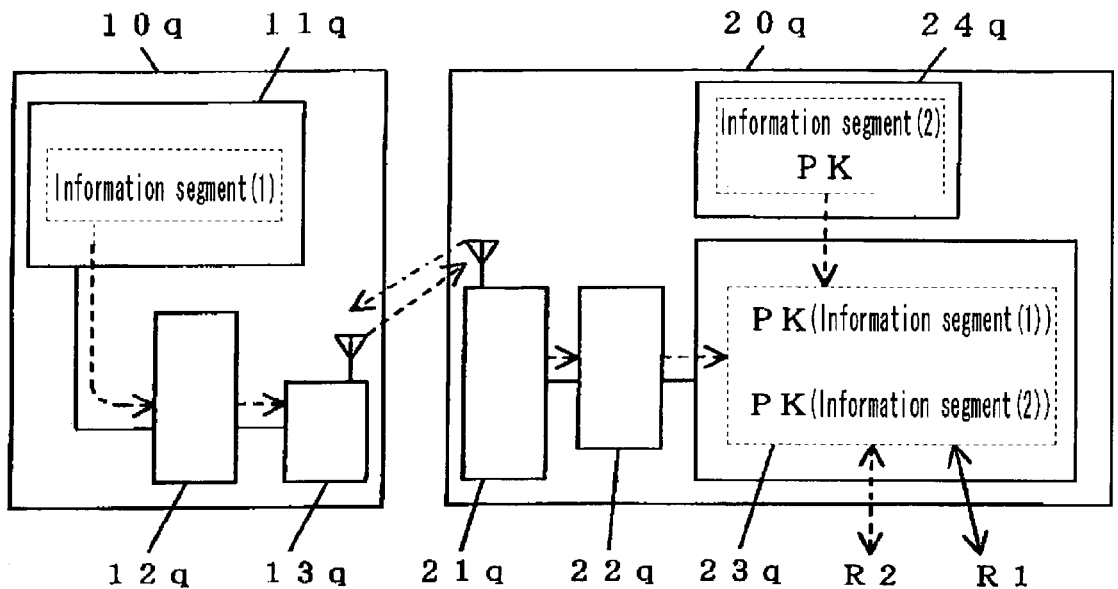
FIG. 28 is a block diagram of the ninth embodiment of the user authentication device according to the present invention.

Next, FIG. 28 illustrates an example of a user authentication device that uses the public key encryption method.

The user-worn device $10q$ is comprised of a signal output device $11q$, a modulator/demodulator $12q$, and a communication device $13q$. The signal output device $11q$ has a storage means for storing the first information segment (1).

The user device $20q$ has a communication device $21q$, a modulator/demodulator $22q$, an encryption device $23q$, and a signal output device $24q$. The signal output device $24q$ has a storage means for storing the second information segment (2) and the key (the public key PK in the present embodiment) to be used for encrypting information. The encryption device $23q$ encrypts the received information segment (1) and information segment (2) which is output from the signal output device $24q$, using the public key PK that is output from the signal output device $24q$, and sends the results to the outside (authentication center $160p$) via a communication device (not shown in the figure). The communication device for sending the information to the authentication center $160p$ may double as the communication device $21q$, or the communication device provided in the user equipment may also be utilized.

The authentication center $160p$ decrypts the information received from the user device $20q$ using the secret key that corresponds to the public key used for encrypting said information. Then the identity of the user 1 is authenticated if the decrypted information segment (1) and information segment (2) can be combined to reconstruct the original information.

Various methods can be used for storing the public key in the user device $20q$. For example, a method can be used that stores the public key in the signal output device $24q$ of the user device $20q$ in advance. Alternatively, a method can be used that sends the public key from the authentication center $160p$ to the user device $20q$ when user authentication is needed or at a desired timing. Alternatively, a method can be used that sends the public key from the third-party authentication agency at which the authentication center $160p$ registered the public key, when user authentication is needed or at a desired timing.

Next, a specific example of combining the divided information obtained by dividing the original information will be explained.

Figure 29:
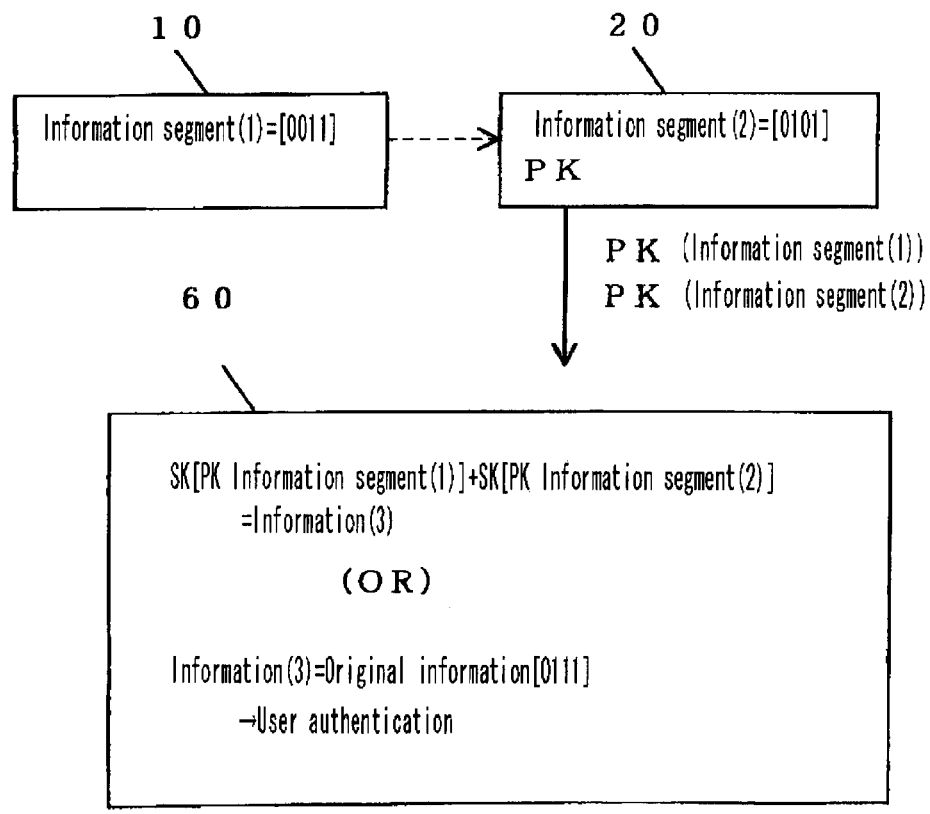
FIG. 29 is a diagram that explains an example in which the divided information is combined.

In the example illustrated in FIG. 29, the original information [0111] is divided into the first information segment (1) [0011] and the second information segment (2) [0101]. Then, the first information segment (1) is stored in the user-worn device 10, and the second information segment (2) is stored in the user device 20. The original information is stored in the storage device at the authentication center 60.

The user device 20 encrypts the received information segment (1) and information segment (2) stored in its storage into "PK (information segment (1)) and PK (information segment (2))" using a predetermined public key PK, and sends them to the authentication center 60.

The authentication center 60 decrypts the information received from the user device 20 ("PK (information segment (1)) and PK (information segment (2))") using the secret key SK that corresponds to the public key PK used by the user device 20, into "SK [PK (information segment (1))] and SK

[PK (information segment (2))]," thus obtaining information segment (1) and information segment (2).

Furthermore, the decrypted information segment (1) and information segment (2) are combined using a predetermined algorithm, thus forming the third piece of information (3). Next, user authentication is performed by comparing information (3) with the original information.

Figure 30:
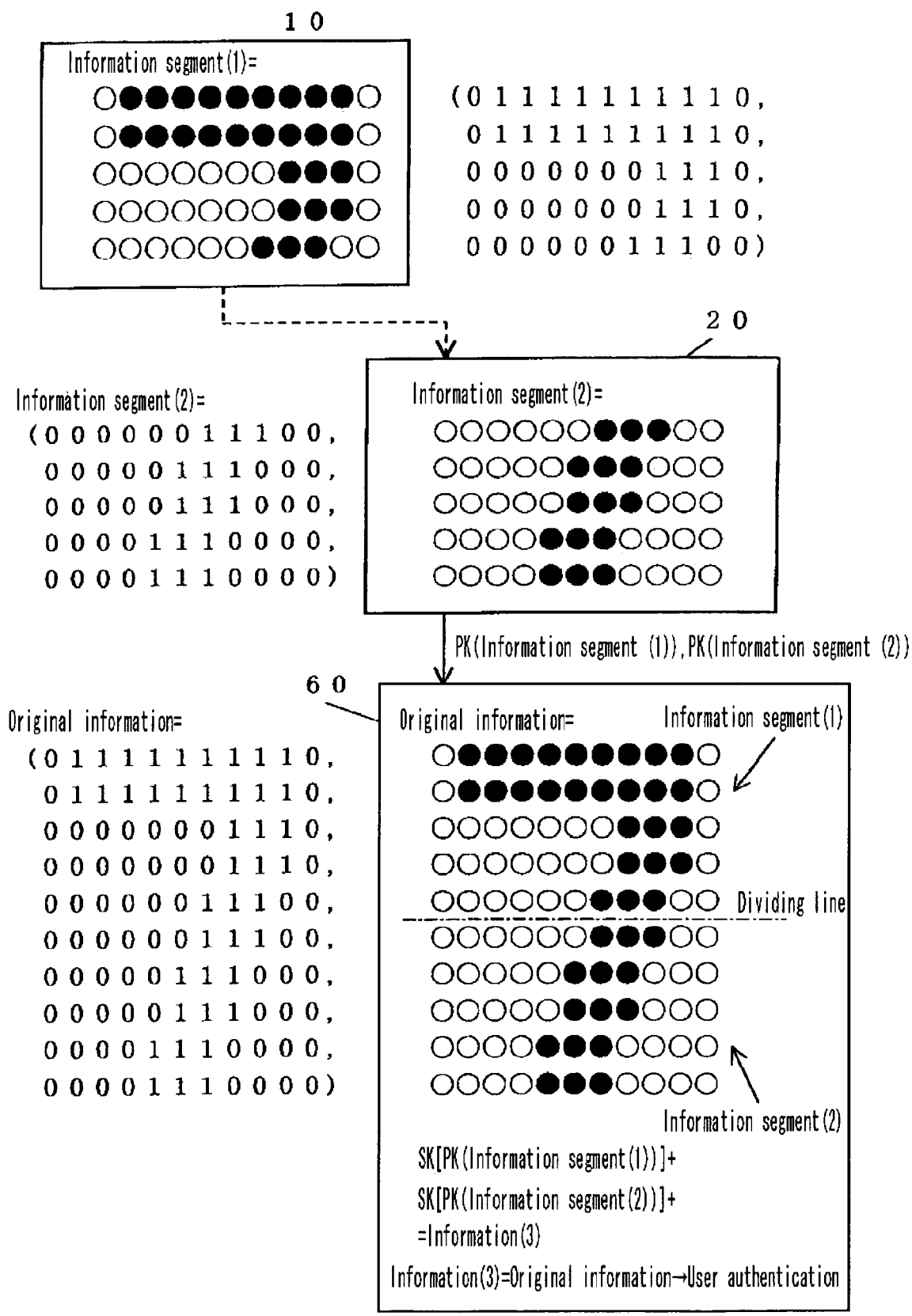
FIG. 30 is a diagram that explains an example in which the divided information is combined.

In the example illustrated in FIG. 30, the original information [a graphic bit matrix for the numeral 7] is divided by the dividing line drawn horizontally in FIG. 30, into the first information segment (1) on the top and the second information segment (2) on the bottom. Then, the first information segment (1) is stored in the user-worn device 10, and the second information segment (2) is stored in the user device 20. The original information is stored in the storage device at the authentication center 60.

The user device 20 encrypts the received information segment (1) and information segment (2) stored in its storage into "PK (information segment (1)) and PK (information segment (2))" using a predetermined public key PK, and sends them to the authentication center 160.

The authentication center 160 decrypts the information received from the user device 20 ("PK (information segment (1)) and PK (information segment (2))") using the secret key SK that corresponds to the public key PK used by the user device 20, into "SK [PK (information segment (1))] and SK [PK (information segment (2))]," thus obtaining information segment (1) and information segment (2).

Furthermore, the decrypted information segment (1) and information segment (2) are combined using a predetermined algorithm, thus forming the third piece of information (3). Further, user authentication is performed by comparing information (3) with the original information.

Figure 31:
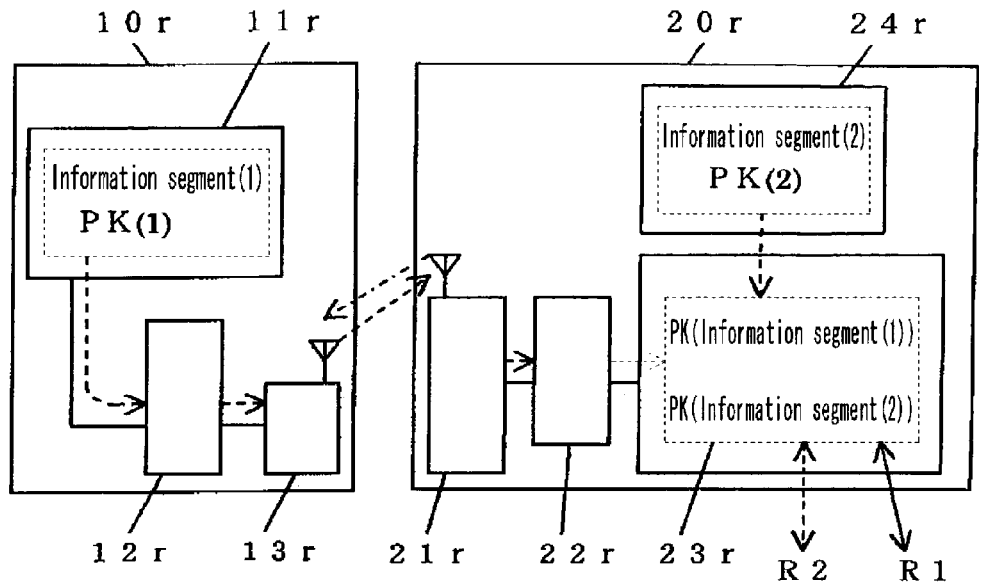
FIG. 31 is a block diagram of the tenth embodiment of the user authentication device according to the present invention.

In the aforementioned embodiments, the public key is stored in the user device. However, also dividing the public key and storing the divided segments in the user-worn device and the user device can further enhance reliability. FIG. 31 illustrates an embodiment in which the public key is divided and stored.

In the embodiment illustrated in FIG. 31, the first information segment (1) formed by dividing the original information is stored in a user-worn device 10r, and the second information segment (2) is stored in a user device 20r. Furthermore, a predetermined public key PK is divided to form a first public key PK (1) and a second public key PK (2). Then, the first public key PK (1) is stored in the user-worn device 10r, and the second public key PK (2) is stored in the user device 20r.

The user-worn device 10r sends the first information segment (1) and the first public key (1).

The encryption device 23r of the user device 20r combines the received public key PK (1) and public key PK (2) stored in its storage using a predetermined algorithm, thus reconstructing the public key PK. The predetermined algorithm is determined based on the method used for dividing the public key PK. Then, the user device 20r encrypts the received information segment (1) and information segment (2) stored in its storage, using the public key PK reconstructed by combining the public keys PK (1) and PK (2), and sends the results to the authentication center 160p.

The authentication center 160p decrypts the received information using the secret key SK that corresponds to the public key PK used by the user device 20r. Then, user authentication is performed by comparing the decrypted information with the original information.

In the present embodiment, the identity of the user is not authenticated unless both information segment (1) and public key PK (1) are correct, thus resulting in high reliability.

Figure 32:
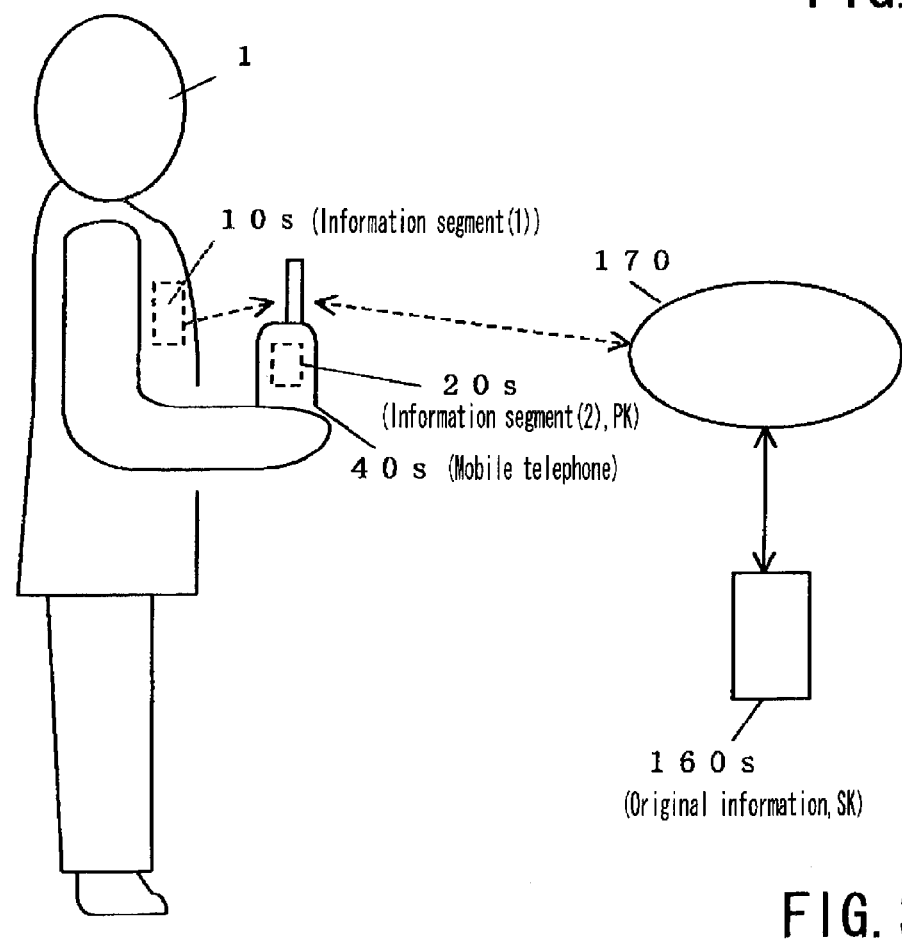
FIG. 32 is a block diagram of the eleventh embodiment of the user authentication device according to the present invention.

FIG. 32 illustrates a user authentication device that uses a mobile telephone as the user equipment and sends information using the public key encryption method.

In the present embodiment, the user-worn device 10s is carried in the chest pocket of the user 1. Further, the user device 20s is installed in the mobile telephone 40s (user equipment). Providing the user device 20s with connection pins that can be connected to the data input/output pins of the mobile telephone 40s can simplify the task of connecting the user device 20s to the mobile telephone 40s.

In the above explanation, information was sent and received between the user-worn device and the user device on a non-contact basis. However, it is also possible to send and receive information on a contact basis. For example, it is possible to connect user-worn equipment such as a magnetic or electric ID card or an ID card tag by inserting it into the card insertion opening of the user equipment such as a personal computer, or to connect user-worn equipment such as a mobile telephone by connecting it using a cable. In these cases, the first information segment is sent from the ID card or the mobile telephone to the personal computer. The personal computer allows its use if the received information and the information stored in its storage can be combined to reconstruct the original information. Conversely, a personal computer can also be used as the user-worn device, and an ID card or mobile telephone can be used as the user device.

The present invention has the effects described below.

The present invention uses information that is obtained by dividing information or a signal that is originally in one piece, like a tally, instead of using biological information, a secret code, or a signature. Individual segments of divided information are stored in the user-worn device to be worn by the user and the user device to be provided in the user equipment to be used by the user; user authentication is performed based on the information obtained by combining the information stored in the user-worn device with the information stored in the user device. Such information does not fluctuate as may be the case with biological information. Furthermore, the communication means and the information combining means can be configured simply and inexpensively using IC chips, etc. Therefore, user authentication can be performed accurately and inexpensively.

Additionally, in the present invention, user authentication is not performed unless the information stored in the user-worn device and the information stored in the user device can be combined to successfully reconstruct the original information. Consequently, there is no risk of unauthorized use even if the secret code, card, ID tag, etc. is stolen. That is, there is no risk of unauthorized use unless both the user device and the user-worn device are lost or stolen. If the user-worn device is comprised of an IC chip, it can be installed in many different components (e.g., rings and eyeglasses) that can be worn by the user. In this case, since the user-worn device can be installed in the component selected by the user, there is hardly any risk that the user-worn device will be stolen. Should there be concern that information has been leaked, the predetermined IC chip in the user-worn device or user device can be replaced.

As explained above, the present invention can be used for performing user authentication for large, unspecified numbers of users simply, inexpensively, highly reliably, and with a high level of security. The present invention is not limited to the embodiments described above, and can be altered, added to, or pared down in various ways as long as the essentials of the present invention are not altered. For example, the assembly mode for the user device and the user equipment, and the assembly mode for the user-worn device and the user-worn equipment can be varied in many ways, e.g., integrated or separate.

The invention claimed is:

1. A generation method for a user authentication device, a first device that sends a first information segment, and that authenticates an identity of a user if an original information can be reconstructed by combining the first information segment received from the first device with a second information segment locally stored at a second device, comprising:

forming a printed circuit board having
an encryption device that generates both an encryption formula and a decryption formula, and that performs encryption using the encryption formula and decryption using the decryption formula,
an encrypted code storage device for storing encrypted code obtained by encrypting original code using the encryption formula generated by the encryption device, and
an original code storage device for storing both the decryption formula generated by the encryption device and the original code;
cutting the printed circuit board to form a first printed circuit board provided with the encryption device and the original code storage device, and a second printed circuit board provided with the encrypted code storage device; and
using the first printed circuit board as the second device and the second printed circuit board as the first device.

2. The generation method for the user authentication device according to claim 1, further comprising the steps of:
generating, via the encryption device, an encryption formula and a decryption formula that change over time;
storing and retaining, via the encrypted code storage device, the encrypted code obtained by encrypting the original code using the encryption formula that is in effect when the printed circuit board is cut; and
storing in the original code storage device both the decryption formula that is in effect when the printed circuit board is cut and the original code.

3. The generation method for the user authentication device according to claim 2, further comprising performing encryption and decryption, via the encryption device, using a chaos computation formula generated by a chaos generator.

4. The generation method for the user authentication device according to claim 1, wherein the step of cutting the printed circuit board includes cutting the printed circuit board at a cutting area formed therein.

* * * * *